(12) United States Patent
Iida

(10) Patent No.: US 7,088,669 B2
(45) Date of Patent: Aug. 8, 2006

(54) OPTICAL DISC, METHOD FOR MANUFACTURING THE SAME, DRIVE FOR THE SAME, AND SAMPER USED TO MANUFACTURE THE SAME

(75) Inventor: Tamotsu Iida, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 601 days.

(21) Appl. No.: 10/195,417

(22) Filed: Jul. 16, 2002

(65) Prior Publication Data

US 2003/0012112 A1 Jan. 16, 2003

(30) Foreign Application Priority Data

Jul. 16, 2001 (JP) ............................. 2001-215621

(51) Int. Cl.
 *G11B 7/24* (2006.01)
 *G11B 7/00* (2006.01)
(52) U.S. Cl. ................... 369/275.4; 369/275.1; 369/47.27; 369/47.31; 369/30.03
(58) Field of Classification Search ............. None
See application file for complete search history.

(56) References Cited

U.S. PATENT DOCUMENTS 6,621,774 B1* 9/2003 Iwanaga ............. 369/44.34

* cited by examiner

*Primary Examiner*—Muhammad Edun
(74) *Attorney, Agent, or Firm*—Birch,Stewart,Kolasch & Birch,LLP

(57) ABSTRACT

An optical disc includes a plurality of lands and grooves alternately arranged in a radial direction of the optical disc, each land wobbling in the radial direction and recording a header recording part for holding address information, there being a difference in elevation between each land and each groove, each grove having a data recording part for storing data, wherein the header recording parts offset alternately for respective lands in the radial direction, the data recording part in the groove and the header recording part in the land are arranged offset in a circumferential direction of the optical disc, and the header recording part in each land enables the same address information to be reproduced for two groove at both sides of each land.

17 Claims, 21 Drawing Sheets

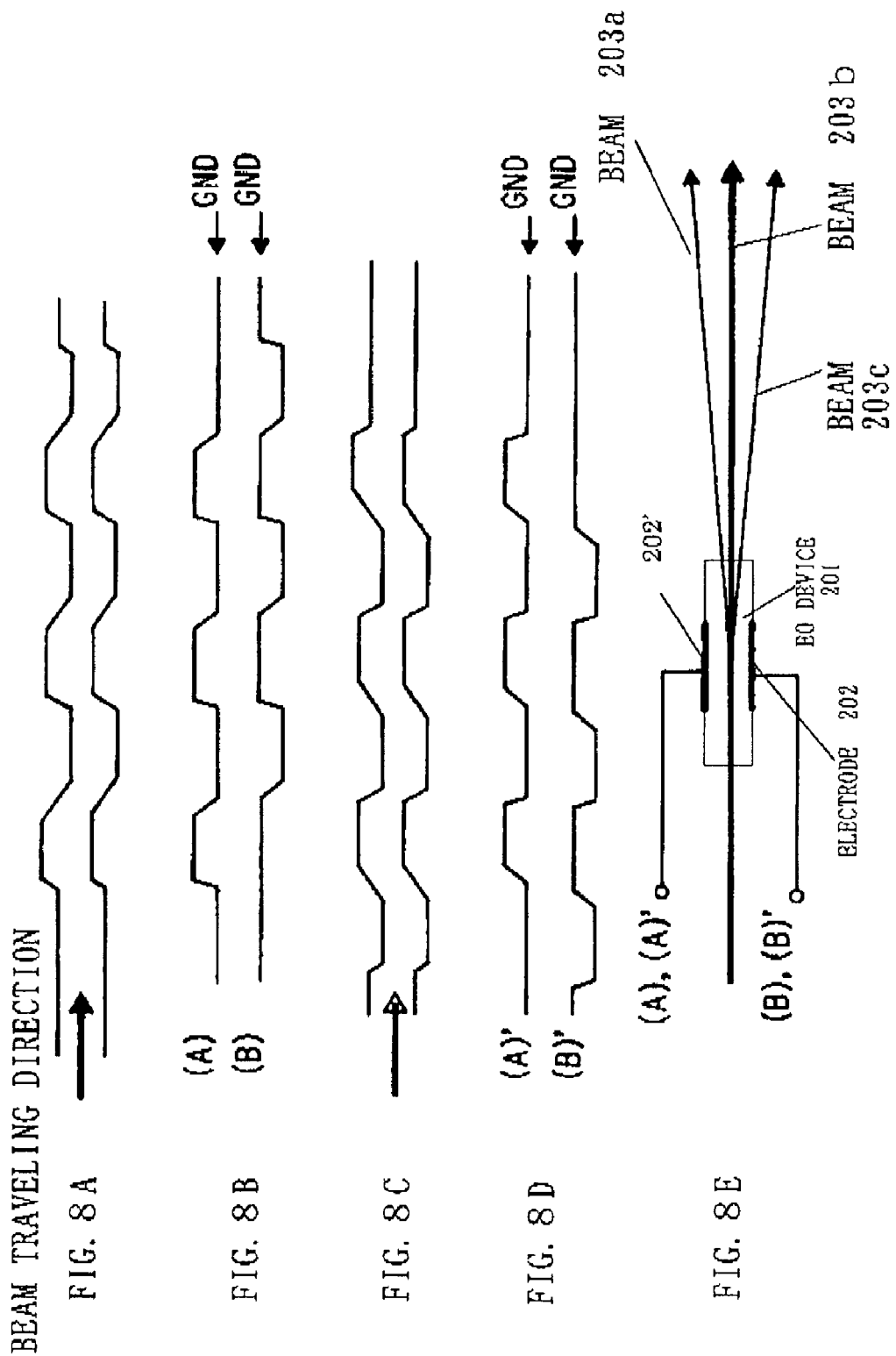

IN Signal

OUT Signal

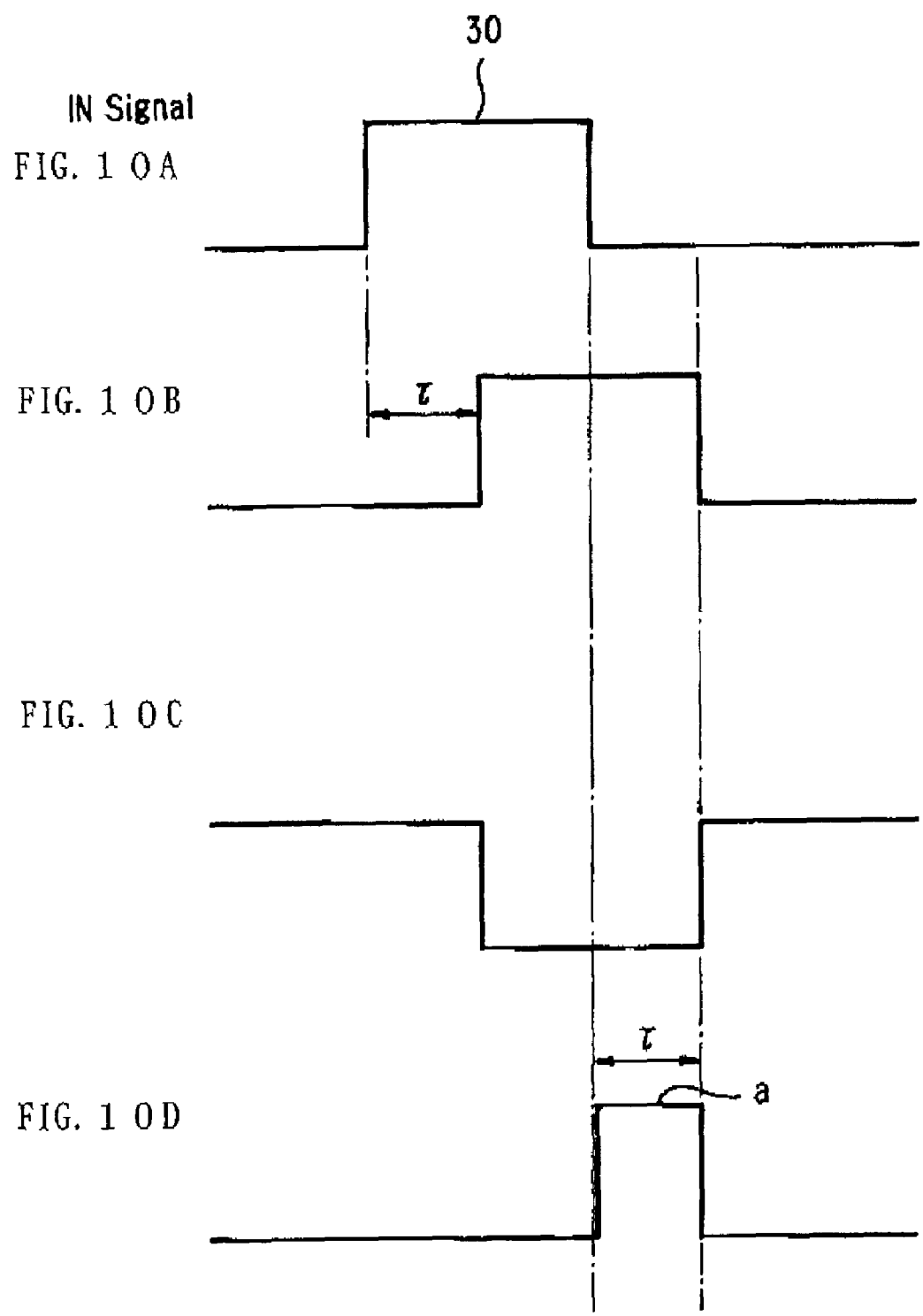

FIG. 1 1 A IN Signal
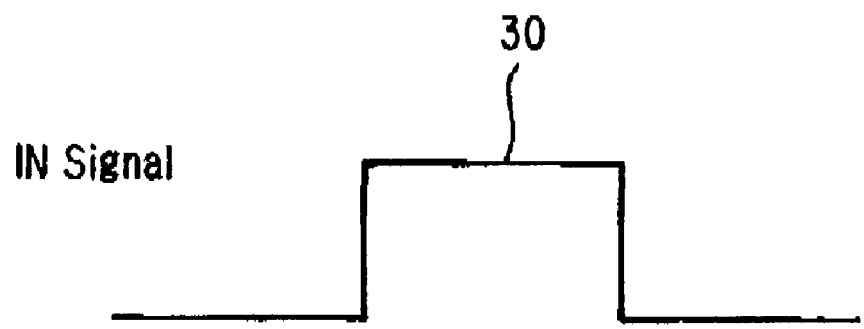
FIG. 1 1 B OUT Signal
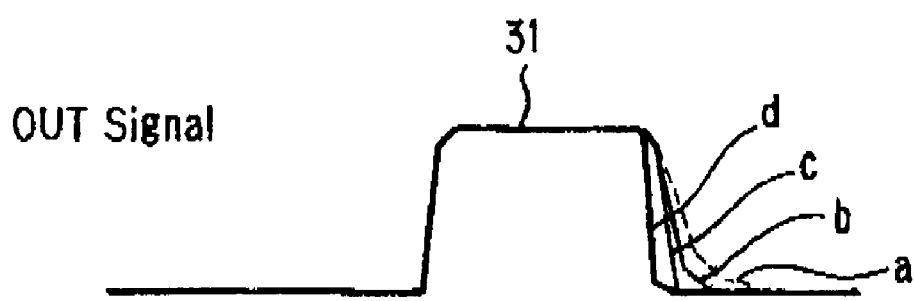
a>b>c>d

| Data Track No | ID1 | | ID2 | |
|---|---|---|---|---|
| k−4 | R | N−3 | L | N−4 |
| k−3 | L | N−3 | R | N−2 |
| k−2 | R | N−1 | L | N−2 |
| k−1 | L | N−1 | R | N |
| k | R | N+1 | L | N |
| k+1 | L | N+1 | R | N+2 |
| k+2 | R | N+3 | L | N+2 |
| k+3 | L | N+3 | R | N+4 |
| k+4 | R | N+5 | L | N+4 |

FIG. 16

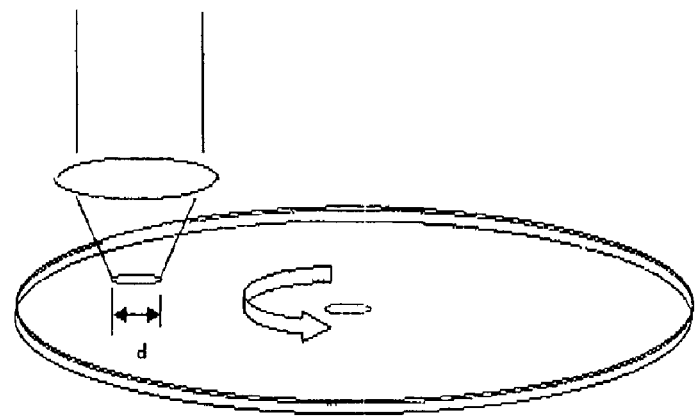
FIG. 18A
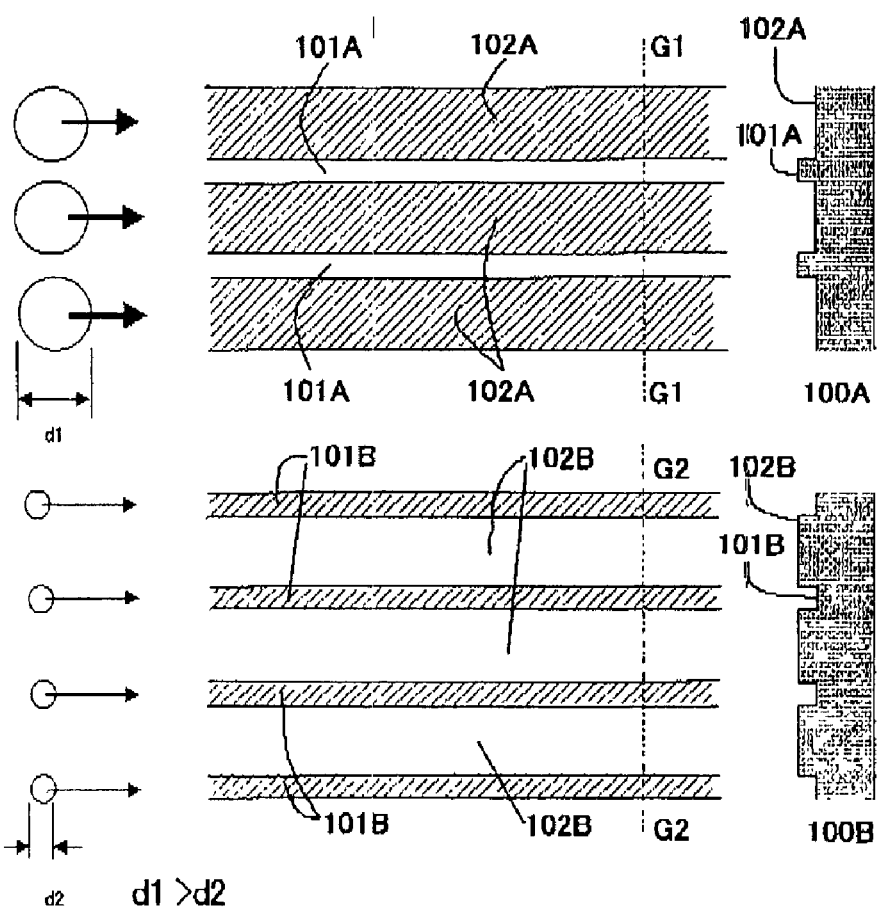
FIG. 18B
FIG. 18C
d1 > d2

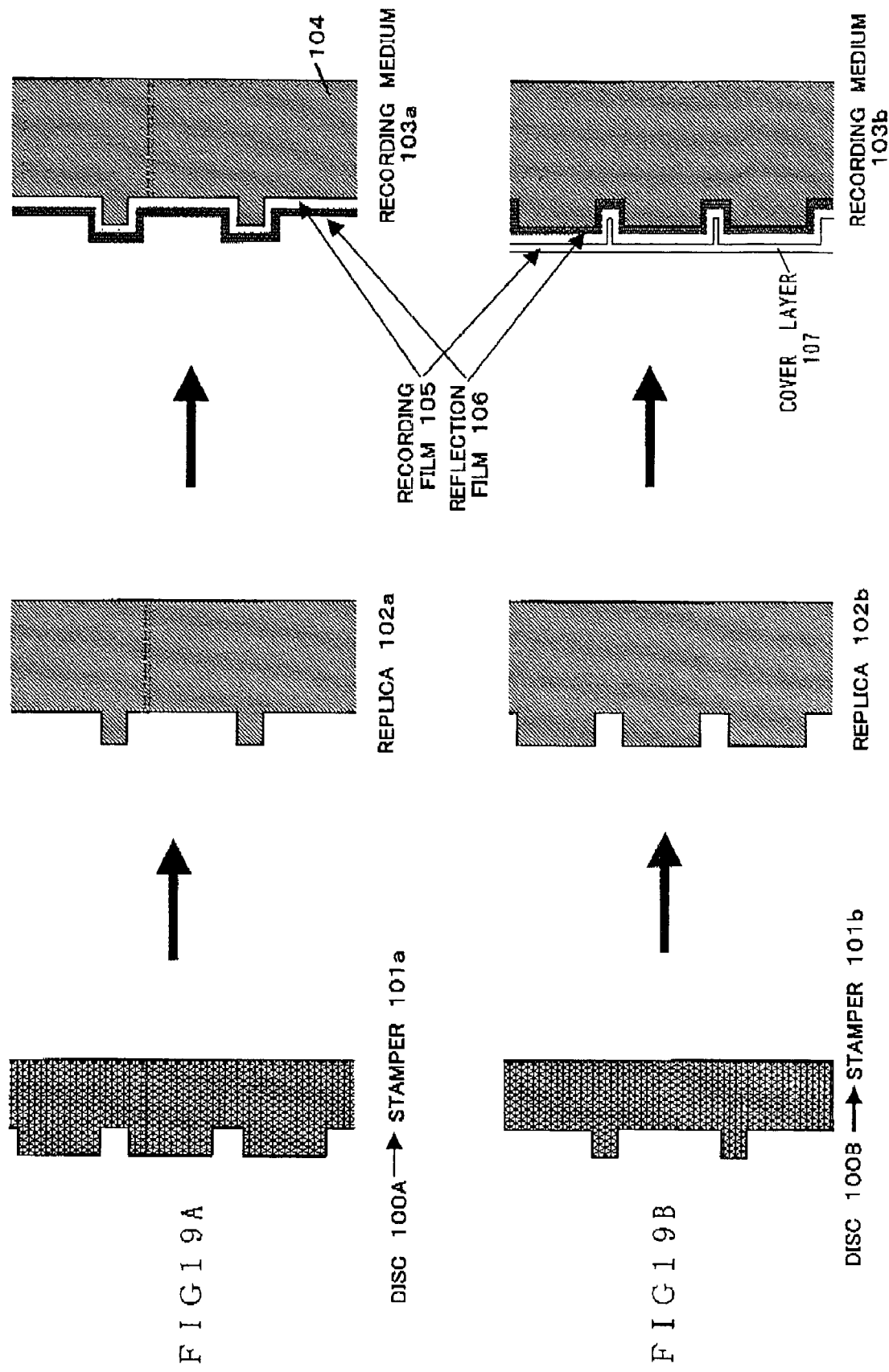

RECORDING MEDIUM 103a

RECORDING MEDIUM 103b

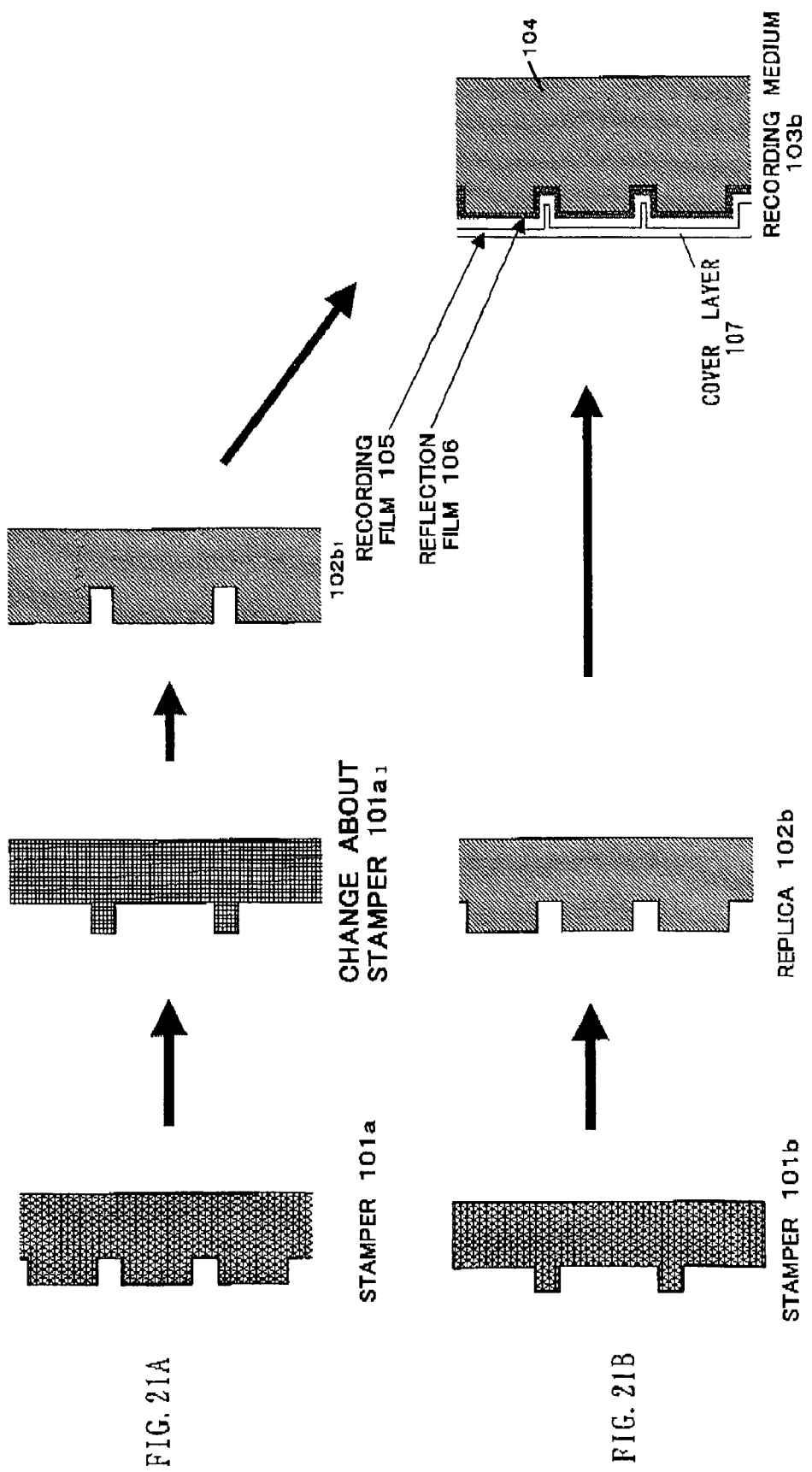

OPTICAL DISC, METHOD FOR MANUFACTURING THE SAME, DRIVE FOR THE SAME, AND SAMPER USED TO MANUFACTURE THE SAME

BACKGROUND OF THE INVENTION

The present invention relates to optical discs, optical disc manufacturing methods and optical disc drives. In particular, the present invention relates to an optical disc structure having a deflection-formed wobbling header part, a method for forming a wobbling header part, an optical disc drive for recording data to and reproducing data from the optical disc loaded in the drive. The present invention also relates to a stamper for manufacturing the optical disc.

A higher recording density has recently been one of the most important technical issues in the art of optical discs, and various densifications have been proposed as represented by the land/groove recording.

Devised header-part structures have conventionally been proposed, as well as a data recording part, for the higher recording density. For example, iD-photo records header (part) information onto only one side of a recording track to reduce interference in a track direction, and header information on both walls at inner and outer sides of the recording track in order to avoid malfunctions resulting from a tilt of the disc.

The header part is configured to record header information through deflection, thereby providing long, uninterrupted recording tracks. Advantageously, this may result in uninterrupted detections when a tracking signal crosses tracks.

A method of recording header information into only one side of a recording track, as in the iD-photo, uses two streaks of optical beams to form wobbling headers, exposes with these two beams offset in a radial direction, and forms separate wobbles at the exposed side surfaces. Therefore, this method necessarily requires a wide exposure track width, and thus has difficulty in increasing the track density in the radial direction.

The increased track density in the radial direction with a narrower width for each track would require such an information track structure as uses a single beam instead of two beams to increase the recording density of the optical disc. In addition, reliable header information and a stagger structure, such as iD-photo, must be maintained even for a single beam for forming the wobbling header. It is also necessary to develop an optical disc drive that manages address information differently from the conventional one in order to reduce such an optical disc to practice.

BRIEF SUMMARY OF THE INVENTION

Accordingly, it is an exemplified object of the present invention to provide a more reliable optical disc with higher density, which redundantly records address information, a method for manufacturing the same, a drive for the same, and a stamper used to manufacture the same.

In order to achieve the above object, an optical disc of one aspect of the present invention includes a plurality of lands and grooves alternately arranged in a radial direction of the optical disc, each land wobbling in the radial direction and recording a header recording part for holding address information, there being a difference in elevation between each land and each groove, each grove having a data recording part for storing data, wherein the header recording parts offset alternately for respective lands in the radial direction, the data recording part in the groove and the header recording part in the land are arranged offset in a circumferential direction of the optical disc, and the header recording part in each land enables the same address information to be reproduced for two groove at both sides of the each land.

According to this optical disc, the header recording part enables the grooves at both sides of the land to redundantly reproduce the same address information. Therefore, even when an optical beam tilts towards one side of the land and cannot read the one side due to aberration, the address information may be reproduced from the other side. The groove may be addressed using the read address information in combination with information indicative of which side of the land has the address information.

Such an optical disc may be manufactured by using a single beam that may deflect in its radial direction to expose the header information in a deflective manner. As its header recording track may have a narrower width than that formed by two beams for exposing the header information in the deflective manner, the instant invention may provide the optical disc with higher recording density, in particular, the higher track density in the radial direction.

The header recording part records a mark that has a front edge and a back edge differently inclined from the front edge so that a difference between inclinations of the front and back edges may express present information. When the header recording part may form such a mark that its differently inclined front and back edges may correspond to preset information, such as the address information, a reproduced signal may reflect a transition time difference between the deflection start time and the deflection end time. For example, a differentiation process would reproduce information because a large signal may be obtained from a reproduced differential signal of a short transition pattern while a small signal may be obtained from a reproduced differential signal of a long transition pattern.

The optical disc may further include an area between the header recording parts offset in the circumferential direction so that the header recording parts do not intersect in the radial direction in the area. An area that divides the circumferentially zigzag arranged header recording parts so that the header recording parts do not intersect in the radial direction would provide reliable data recording and reproduction, because interference between upstream and downstream header recording parts in a traveling direction of an optical beam may be avoided in reproducing information.

The area may include a mark for reading out a synchronization signal. Such a mark in the area for reading a synchronizing signal would provide the optical disc with an efficient format, and contribute to the higher recording density of the optical disc. The land may have a width in the radial direction of 0.30 μm or below.

The groove may be arranged closer than the land to an incidence surface of an optical beam for recording and/or reproducing the data. When the data recording track is arranged closer to the incidence surface of the optical beam while the header recording track is arranged far from the incidence surface of the optical beam, the manufacture of the optical disc requires three steps of producing a master, forming a stamper, and replicating optical discs. On the other hand, when the data recording track is arranged far from the incidence surface of the optical beam while the header recording track is arranged closer to the incidence surface of the optical beam, the manufacture of the optical disc requires an additional step of producing a master mother. Therefore, when the data recording track is arranged closer to the incidence surface of the optical beam while the header recording track is arranged far from the incidence surface of the optical beam, the manufacture of the optical disc becomes easier.

A method according to another aspect of the present invention for formatting grooves in the above optical disc includes the steps of writing different address information for each land, and addressing the grooves using a combination of the address information and side information indicative of which side of the land has the address information for the groove. This formatting method combines the address information with side (i.e., right or left) information, preferably enhancing reliability with redundancy and achieving higher density.

A method according to another aspect of the present invention for identifying an address of the above optical disc includes the steps of detecting the address information different for each land, determining which side of the land has the address information for the groove, which address information is readable by an optical beam for recording and/or reproducing the data, and identifying an address of the groove using the address information and side information indicative of which side of the land has the address information for the groove. This formatting method also combines the address information with side (i.e., right or left) information, and is suitable for the higher density.

A stamper according another aspect of the present invention includes a plurality of lands and grooves alternately arranged in a radial direction of the optical disc, each land wobbling in the radial direction and recording a header recording part for holding address information, there being a difference in elevation between each land and each groove, wherein the header recording parts offset alternately for respective lands in the radial direction, and the header recording part in each land enables the same address information to be reproduced for two groove at both sides of the each land. This stamper may be used to manufacture the above optical disc.

A method according to another aspect of the present invention for manufacturing an optical disc comprising a step of transferring a signal surface onto a disc substrate using a stamper, wherein the stamper is a master produced in a master production process that exposes header information in a deflection manner using a single optical beam that way deflect in a radial direction while offset recording the header information in a circumferential direction for adjacent parts each of which holds the header information. When the header information is exposed in a wobbling manner using a radially deflectable single optical beam, while offset recorded in a circumferential direction for adjacent header information recording areas, the header recording track may have a narrower width than that formed by two beams for exposing the header information in the deflective manner. Therefore, the instant invention may provide the optical disc with higher recording density.

An electro-optic ("EO") deflector may be used to deflect the optical beam, and has an electrode supplied with such a voltage that leading and trailing edges inclining over time in a pulse waveform may change in accordance with preset information. The EO deflector may deflect an optical beam quickly, does not cause deterioration of the deflected light, and may control the deflection speed of the optical beam as a voltage waveform applied to its electrode. Thus, the EO deflector may easily expose a desired mark. In other words, when an EO deflector is used to deflect the optical beam, and applies to an electrode such a voltage that time-dependent inclinations at the leading and trailing edges in a pulse waveform may express preset information, the optical disc having a desired mark may be manufactured easily and precisely.

The time-dependent inclination in the pulse signal for driving the electro-optic deflector may be controlled by a time constant of a circuit including the electro-optic deflector. As the EO deflector is capacitive load, the charge and discharge time constants of a circuit including the EO deflector are adjustable through control over impedance viewed from a drive device for the EO deflector. When the circuit including the EO deflector uses different charge and discharge time constants, the time-dependent inclinations at the leading and trailing edges change in the pulse waveform output. Therefore, the control over the time-dependent inclination in the pulse signal for driving the EO deflector using the time constant of the circuit including the EO deflector would arbitrarily adjust inclinations in the leading and trailing edges, thereby manufacturing the optical disc having a desired mark easily and precisely.

A drive according to another aspect of the present invention for the above optical disc includes a rotation control part for controlling rotations of the optical disc, an optical head for irradiating an optical beam along the groove, a recording/reproducing signal processing circuit for obtaining a reproduction signal from a readout signal waveform detected by the optical head, and an address information management part for obtaining correct address information from the address information reproduced by the recording/reproducing signal processing circuit, the address information management part determining the correct address based on the address information reproduced from the header recording parts alternately offset in the circumferential direction, and a side at which the address information is recorded. The optical disc drive thus has the address information management part for determining the correct address based on the address information reproduced from the circumferentially alternately offset header recording parts, and a side at which the address information is recorded. As a consequence, even when the address information is unavailable from one side of the circumferentially alternately offset header recording part, the address information reproduced from the other side and the recorded side information of the address information would provide the correct address information, enabling the above optical disc to be recorded and reproduced.

The optical disc may have a sectional structure that includes a substrate, a reflection film and a recording film in this order, wherein the optical head irradiates the optical beam onto the recording film in the optical disc from a side opposite to the substrate with respect to the reflection film. The light incidence upon this film surface would enable the groove to be arranged closer than the land to the incidence surface of the optical beam for recording data into and reproducing data from the optical disc.

Other objects and further features of the present invention will become readily apparent from the following description of preferred embodiments with reference to accompanying drawings.

BRIEF DESCRIPTION OF THE DRAWINGS

FIGS. 8A–8E show waveform diagrams for explaining a method for producing the header recording parts shown in FIG. 7 using an electro-optic ("EO") deflector.

FIGS. 10A–10D show a timing chart for a pulse drive circuit shown in FIG. 9.

FIGS. 11A–11B show a waveform diagram for explaining effects of the pulse drive circuits shown in FIG. 9.

FIG. 16 shows a table of the address format of the optical disc according to the present invention.

FIGS. 18A–18C show a schematic perspective, plane and sectional views for explaining two exposure methods for producing masters for optical discs using two types of optical beams having different beam diameters.

FIGS. 19A–19B show several sectional views of stampers produced from the masters shown in FIG. 18, replicas produced from the stampers, and recording media produced from the replicas.

FIGS. 21A–21B show several sectional views for explaining a method for structurally changing one recording medium shown in FIG. 19 so that the changed one has the same incidence direction as the other.

DETAILED DESCRIPTION OF THE PREFERRED EMBODIMENTS

Figure 1:
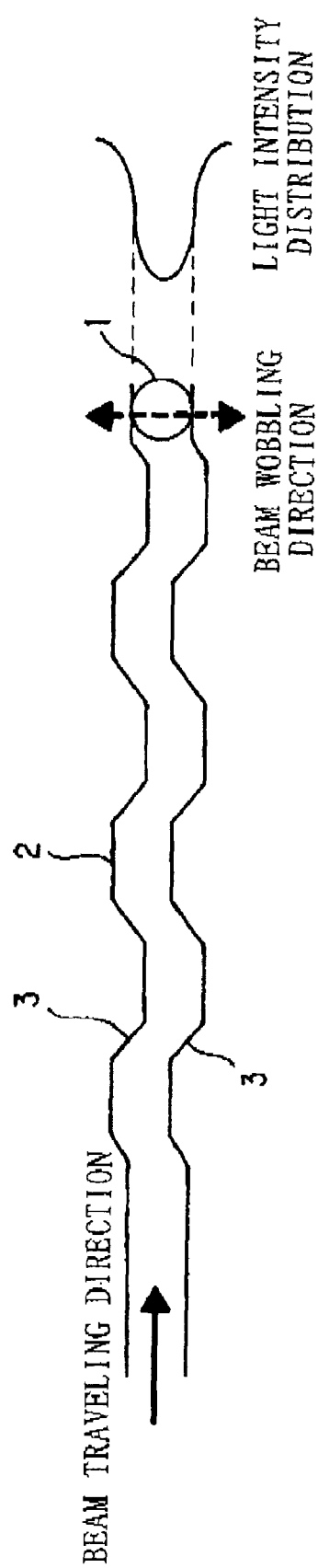
FIG. 1 shows a schematic plane view illustrating an exposure method for exposing a pattern according to the present invention.

Before an optical disc of one embodiment according to the present invention is described, a description will be given of a structure of a stamper and an irradiation direction of a recording/reproducing beam. Depending upon the focused beam diameter, there are two methods for forming recording tracks with the same track density, that is, one forming a boundary area using the remaining part after exposure and the other forming a boundary area as an exposed area.

Initially, as shown in FIG. 18A, suppose an exposure with a beam having a beam diameter "d". A description will be given of the way of maintaining an area for a recording track larger than half of the track pitch. Here, FIG. 18A is a schematic perspective view for explaining exposure of a track with a focused optical beam and a lens. The beam diameter "d" as "d1" that is larger than half of the track pitch, as shown in FIG. 18B left, would use the remaining area as a boundary area after the exposure of the optical beam. In FIG. 18B, 101A denotes a land as a boundary area, while 102A denotes a groove as a recording track. Here, the instant application does not necessarily define the term "groove" as a trench or lower part, and the term "land" as a shoulder or height. As discussed below, a transfer exchanges a relationship between the trench and the height. As discussed later, the instant application defines a land as an object to be wobbled and a groove as one that serves as a recording track.

On the other band, the beam diameter "d" as "d2" that is smaller than the half of the track pitch, as shown in FIG. 18C left, would use the unexposed area as a recording track. In FIG. 18C, 101B denotes a land as a boundary area, while 102B denotes a groove as a recording track in an optical disc as a final form. As discussed, one that is formed as a groove part becomes the land to form addresses in FIG. 18C.

A difference between these exposure methods would lead to a difference between a concave and a convex on a master developed after the exposure. They correspond to positive and negative relationships. FIG. 18B right shows a sectional view of a developed master 100A taken along a line G1—G1 in FIG. 18B left. It is understood that the recording track 101A appears as a convex part between adjacent exposed areas 102A. On the other hand, FIG. 18C right shows a sectional view of a developed master 100B taken along a line G2—G2 in FIG. 18C left. It is understood that the exposed area 101B appears as a concave recording track.

The recording tracks are formed similarly if the shape, in particular, size of a beam diameter may be always maintained. However, there is indeed a significant difference in quality when these beam diameters "d" have the same degree of variability. If it is assumed that the both exposure beams have the same degree of variability, the larger beam diameter d (i.e., d1) has an actual size fluctuation larger than that of the smaller beam diameter d (i.e., d2). Therefore, the width fluctuation in the boundary area formed by the remaining portion after exposure in FIG. 18B is larger than that of the boundary area formed by the exposure area in FIG. 18C. The higher recording density requires a smaller track density, and thus a smaller width of the boundary area between the recording tracks. The width fluctuation of this boundary area corresponds to a fluctuating distance between adjacent tracks, greatly affecting the recording property.

As in the following embodiments, in recording data by deflecting or wobbling the boundary area, the higher recording density in a linear or circumferential direction is unavailable without a smaller focused beam diameter. A simultaneous reduction of reducing the track density as well as the recording linear density is necessarily demanded; technically, a focused beam diameter is required to be small.

FIGS. 19A and 19B show procedures of producing stampers from exposed masters, in turn, producing replicas from these stampers, and finally producing recording media from these replicas. The stamper is formed by plating the exposed master. The stamper corresponds to a mold for producing a multiplicity of replicas through molding. A convex/concave pattern on the stamper inverts that on the master.

Therefore, the stamper 101a is formed from the master 100A as shown in FIG. 19A, while the stamper 101b is formed from the master 100B as shown in FIG. 19B. A recording medium is produced by forming recording and reflection films on a replica replicated from the stamper. FIG. 19 omits protective layer and other various functional films.

As discussed below, the recording track is an area that has a width of at least half of track pitch or larger. Of course, as in the land/groove recording, both the convex and concave portions may be used as a recording track, but the instant embodiment uses only one of them as the record track. It is known that the recording track has improved recording property when the recording track is arranged closer to an incidence surface of a recording/reproducing optical beam. There are two methods for irradiating a recording/reproducing optical beam, i.e., an irradiation through a substrate in the optical disc, and an irradiation from a recording film side. The replica substrate is required to have mechanical rigidity and a thin incident layer. This is because the optical distortion, for example, due to tilting of a light transmitting substrate becomes small as the substrate becomes thin. On the other hand, the thicker the substrate is, the smaller a surface tilt of the substrate becomes. Although it is ideal to use a small recording/reproducing optical beam and maintain the substrate thin for higher recording density and reduced tilt, they are contradictory concepts This means a limitation of a conventional method adopted for many optical discs, which uses a recording/reproducing optical beam through the substrate. One solution for this problem is to make the replica substrate serve as a holding mechanism for holding a pattern, and to introduce recording light from a side close to the recording film surface and opposite to the replica in recording the recording film.

Figure 20A:
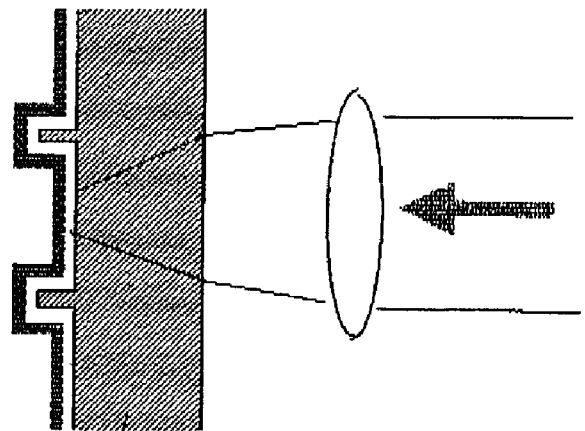
FIGS. 20A–20B show two sectional views for explaining a relationship between two types of recording media shown in FIG. 19 and incident directions of a recording/reproducing optical beam.
Figure 20B:
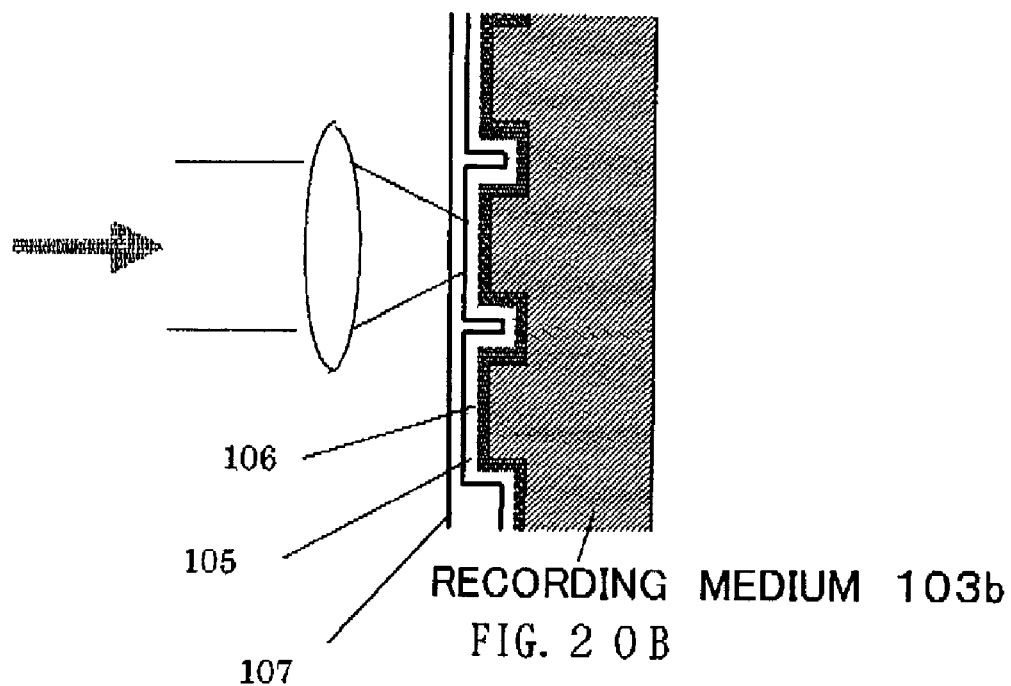

As shown in FIGS. 19A and 20A, the recording medium 103A has, similar to the conventional optical disc, a film structure (including a substrate 104, a recording film 105, and a reflection film 106) which introduces a recording/reproducing optical beam through a substrate. On the other hand, as shown in FIGS. 19B and 20B, the recording medium 103B has a film structure (including the substrate 104, the reflection film 106, the recording film 105 and a cover layer 107) which introduces a recording/reproducing optical beam from the recording film side. Here, FIG. 20A is a sectional view of the recording medium 103A that introduces an optical beam through the substrate FIG. 20B is a sectional view of the recording medium 103B that introduces an optical beam from the recording surface side, not through the substrate. The order of the recording film 105 and reflection film 106 viewed from the substrate 104 corresponds to an incident direction of a recording/reproducing optical beam. FIG. 20 also omits a protective film, but the recording medium 103A has a sufficiently thin protective film on the reflection film 106 while the recording medium 103B has the protective film on the recording film 105. The protective film serves to protect the films 105 and 106 from an external environment.

Of course, the recording medium 103B may be produced from the stamper 101a. A description will be given of this case with reference to FIG. 21. As shown in FIG. 19B, a replica 102b is derived from the stamper 101b and, in turn, provides the recording medium 103B. In an attempt to introduce a recording/reproducing optical beam onto a film surface from the stamper 101a corresponding to the exposed master 100A, an inverted stamper (or so-called master mother) $101a_1$ and then a replica $102b_1$ should be manufactured. This is because when positions of the recording film 105 and the reflection film 106 in the recording medium 103A are exchanged in FIG. 19A and an optical beam is irradiated from the left side in FIG. 20A, the recording track as a concave portion becomes far from the incidence surface of the optical beam and the recording/reproducing property deteriorates.

Now a production of the replica 102b from the stamper 101b as a master as shown in FIG. 21 lower, is compared to a production of a replica $102b_1$ from an inversion stamper $101b_1$ as a master mother as shown in FIG. 21 upper. It appears that the replicas 102b and $102b_1$ are the same in two schematic sectional views in FIG. 21 upper, but the replica $102b_1$ actually has more deteriorated property than the replica 102b. This is because the increased number of transfers deteriorates the pattern accuracy and increases surface noises. Therefore, although FIG. 21 upper schematically shows that the replica $102b_1$ may produce the recording medium 103B, the recording medium $103B_1$ (not shown) derived from the replica $102b_1$ has deteriorated quality in comparison with the recording medium 103B. In addition, an additional step of manufacturing a master mother would cause a complex process and increase cost. Therefore, the incidence on a film surface preferably uses the master 100B that may provide the stamper 101b that does not require the master mother. The instant embodiment describes, as shown in FIG. 18C, the advantageous exposure with a cutting beam diameter narrower than half of a track pitch.

With reference to the accompanying drawings, a description will now be given of an optical disc, a stamper manufacturing method, and an optical disc drive of the present invention.

FIG. 1 is a schematic plane view of exposure of an exposed pattern 2 as a base of header recording track on a master by deflecting or wobbling an optical beam 1 in a direction perpendicular to its traveling direction. An optical disc deflects the beam 1 in its radial direction of the master. As understood from FIG. 1, there is a single exposure beam 1, and the same mark or wobble 3 as a base of the header recording part is recorded at both sides of the exposed pattern 2. This is different from the conventional iD-photo that uses two exposure beams. The beam I has the beam diameter "d2" in FIG. 18C, and the exposed pattern 2 corresponds to 101B in FIG. 18C.

Figure 2:
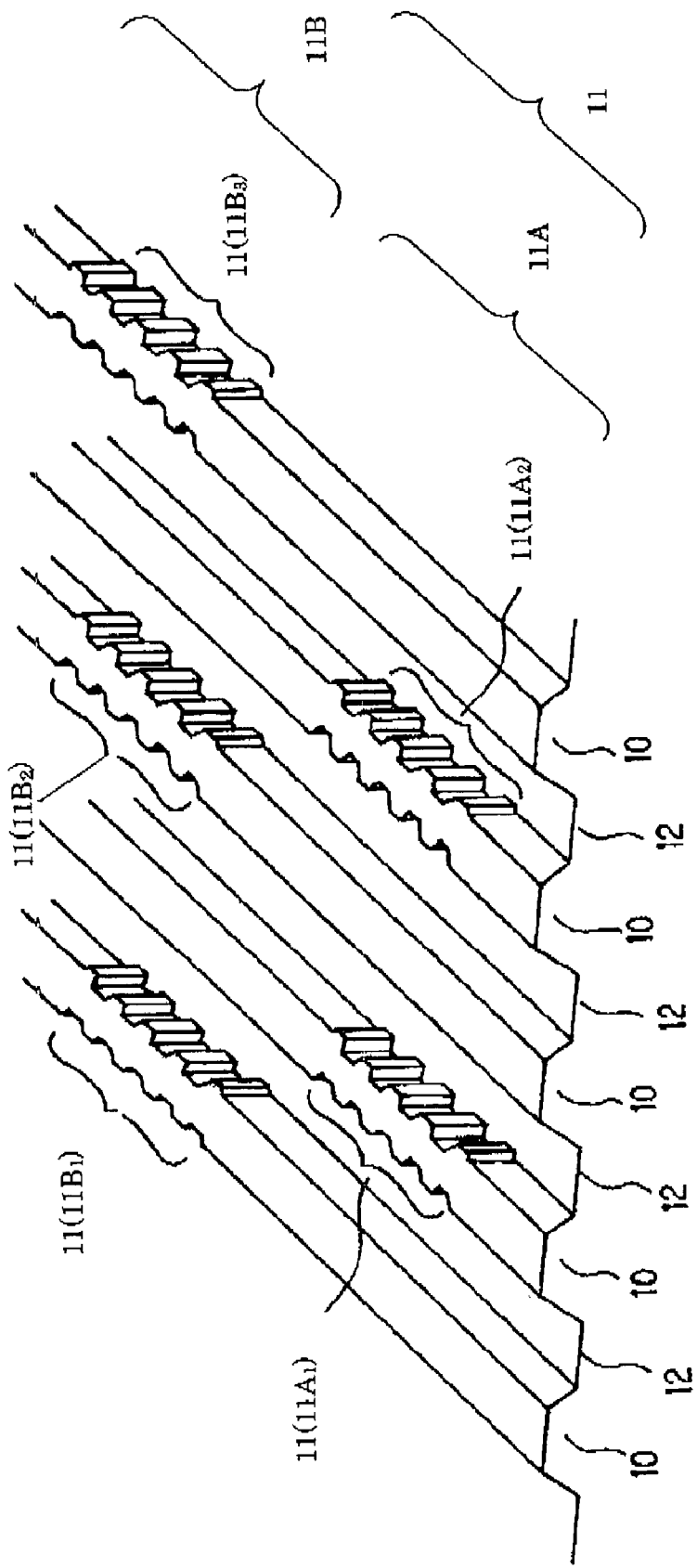
FIG. 2 shows a schematic perspective view illustrating header recording parts formed on a stamper of one embodiment according to the present invention, which is produced from a master formed by the exposure method shown in FIG. 1.

FIG. 2 is a schematic perspective view of a convex/concave pattern formed on a stamper after plural streaks of exposed patterns 2 are exposed and followed by a stamper production step including a developing step and a replication step. The convex/concave pattern corresponds to stamper 101b in FIG. 19B. In FIG. 2, reference numeral 10 denotes a header recording track corresponding to the exposed pattern 2 on the master, reference numeral 11 denotes a header recording part including address information corresponding to the mark 2 formed on the master, and reference numeral 12 denotes a data recording track formed between the header recording tracks. The header recording track 10 is formed as a land while the data recording track 12 is formed as a groove.

More specifically, a plurality of header recording parts 11 may be divided into first ID part 11A and second ID part 11B. The first ID part 11A is used to identify an address, and includes different patterns $11A_1$, $11A_2$, etc., while the second ID part 11B is used to identify the address, and includes different patterns $11B_1$, $11B_2$, $11B_3$, etc. 11A generalizes $11A_1$, etc., 11B generalizes $11B_1$, etc., and 11 generalizes all of them.

Figure 3:
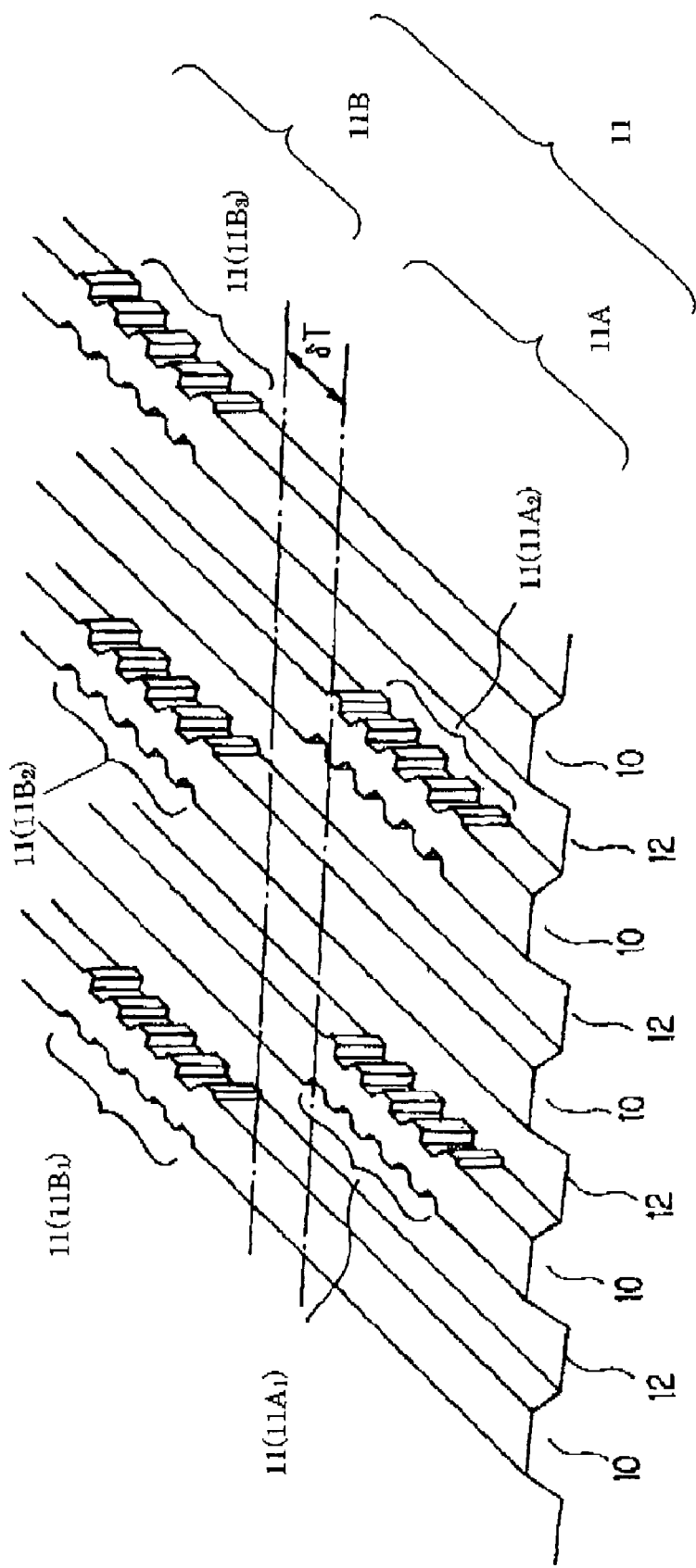
FIG. 3 shows a schematic perspective view illustrating an offset gap δT in the header recording parts across adjacent lands in the stamper shown in FIG. 2

As understood from FIG. 2, the header recording parts 11 in adjacent header recording tracks 10 alternate offset or zigzag so that they do not overlap or neighbor in the radial direction. The reason why the header recording parts 11A and 11B are arranged unadjacently in the radial direction is to avoid interference that occurs by reading these two header recording parts simultaneously in reproducing one of them. It is preferable to provide a gap δT between the header recording parts 11A and 11B in a track or linear direction as shown in FIG. 3 so as to avoid the interference. The gap δT is preferably larger than a substantial beam diameter of the reproducing optical beam, and the small gap δT would result in the interference and consequently malfunctions The gap δT is, for example, 0.30 μm. Here, FIG. 3 is a schematic perspective view of an offset gap δT between the header recording parts 11A and 11B in the header recording tracks 10 in the stamper shown in FIG. 2.

Figure 4:
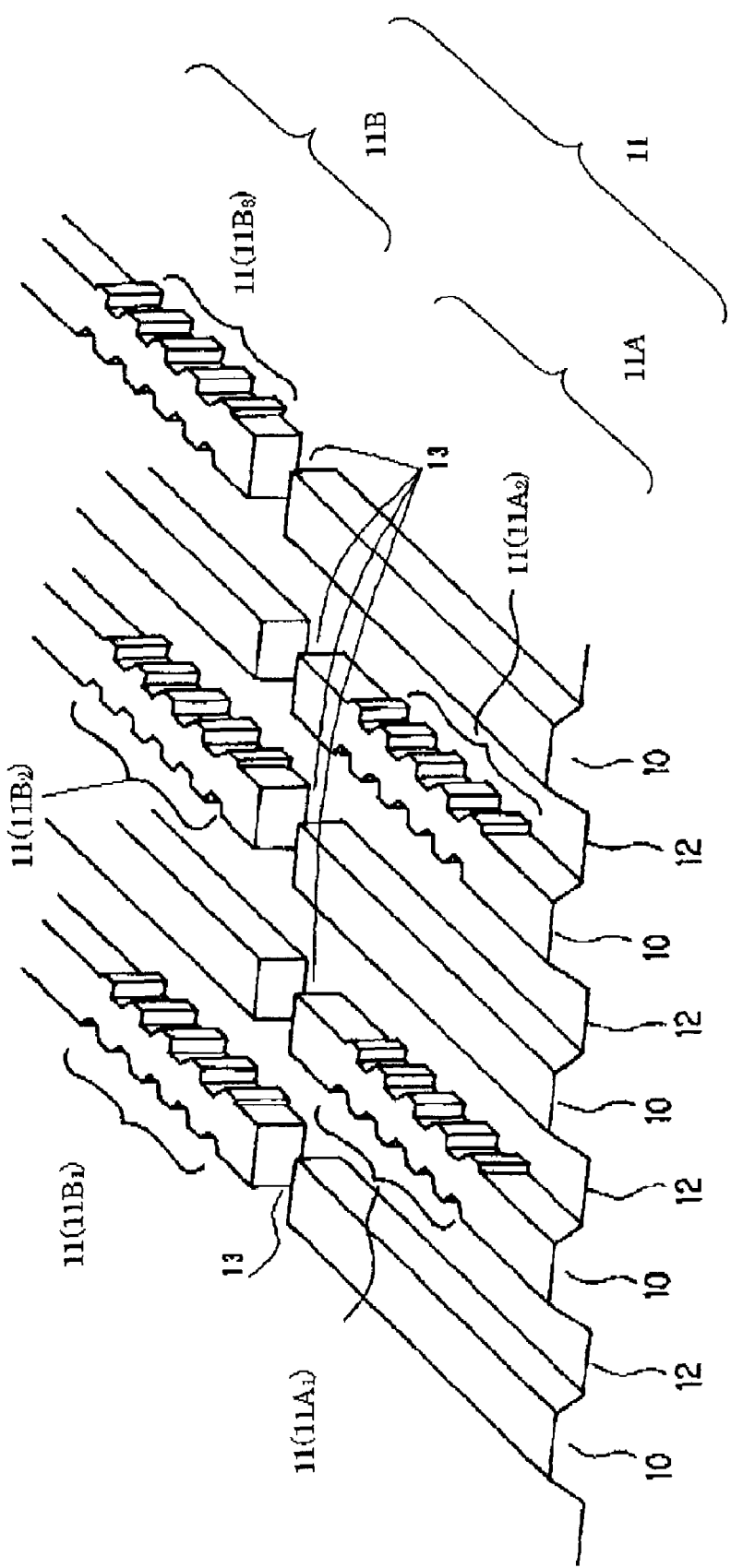
FIG. 4 shows a schematic perspective view for explaining a method for embedding synchronizing signals of a first embodiment to effectively use the offset gap δT shown in FIG. 3.

It is efficient that the gap δT stores information irrelevant to the data interference in the radial direction, e.g., a synchronizing signal. For example, as shown in FIG. 4, the land may be cut to insert a discontinuous reflection signal as a synchronizing signal. Here, FIG. 4 shows a schematic perspective view for explaining a method for embedding synchronizing signals of a first embodiment to effectively use the offset gap δT. The embodiment shown in FIG. 4 traces the recording track 12 and detects a signal read out from a mirror part 13 as a synchronizing signal. Understandably, FIG. 4 shows only part of mirror parts 13, and there are plural mirror parts 13 at a certain period in each track (or in the track direction) to serve as a synchronizing signal.

Figure 5:
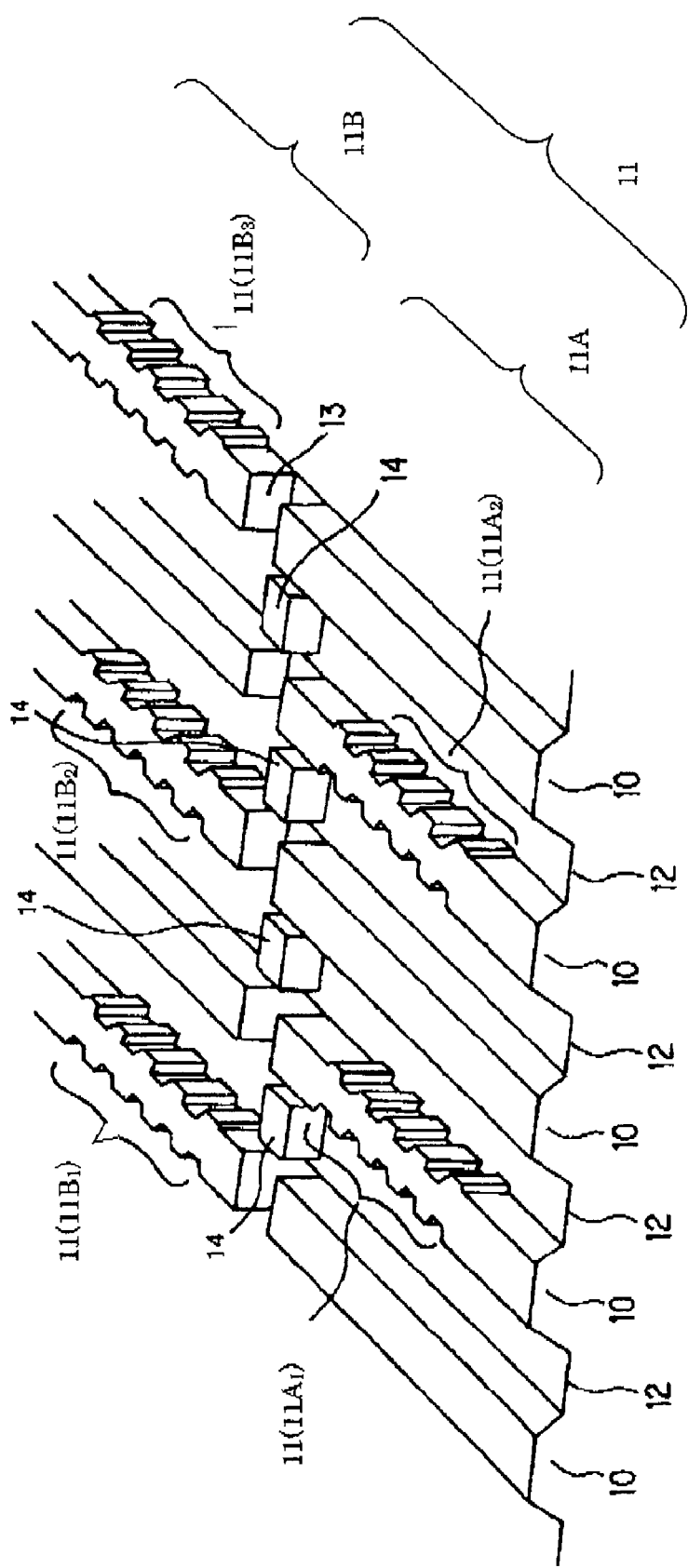
FIG. 5 shows a schematic perspective view for explaining a method for embedding synchronizing signals of a second embodiment to effectively use the offset gap δT shown in FIG. 3.

FIG. 5 shows a method for embedding synchronizing signals of a second embodiment to effectively use the offset gap δT. FIG. 5 adds a convex mark 14 for synchronization on an aperture on the recording track 12 between the adjacent mirror parts 13 in radial direction, and a signal read from the mark 14 serves as a synchronizing signal. Of course, a side of a beam may detect the exposure cut mark 13 without the mark 14 on the data recording track 12, but the mark 14 would lead to a detection of a larger signal. The mark 14 on the data recording track 12 is formed at a position significantly deflected from the header recording part 11 track in the radial direction. In other words, the mark 14 may be formed by moving the mark 13 in the exposure. An alternative embodiment may use another optical beam other than the beam for exposing the track 10 for forming the header recording tracks 11. It is noted that FIG. 5 shows only part of marks 14, and there are plural marks 14 at a certain period in each track (or in the track direction) to serve as a synchronizing signal.

Figure 6:
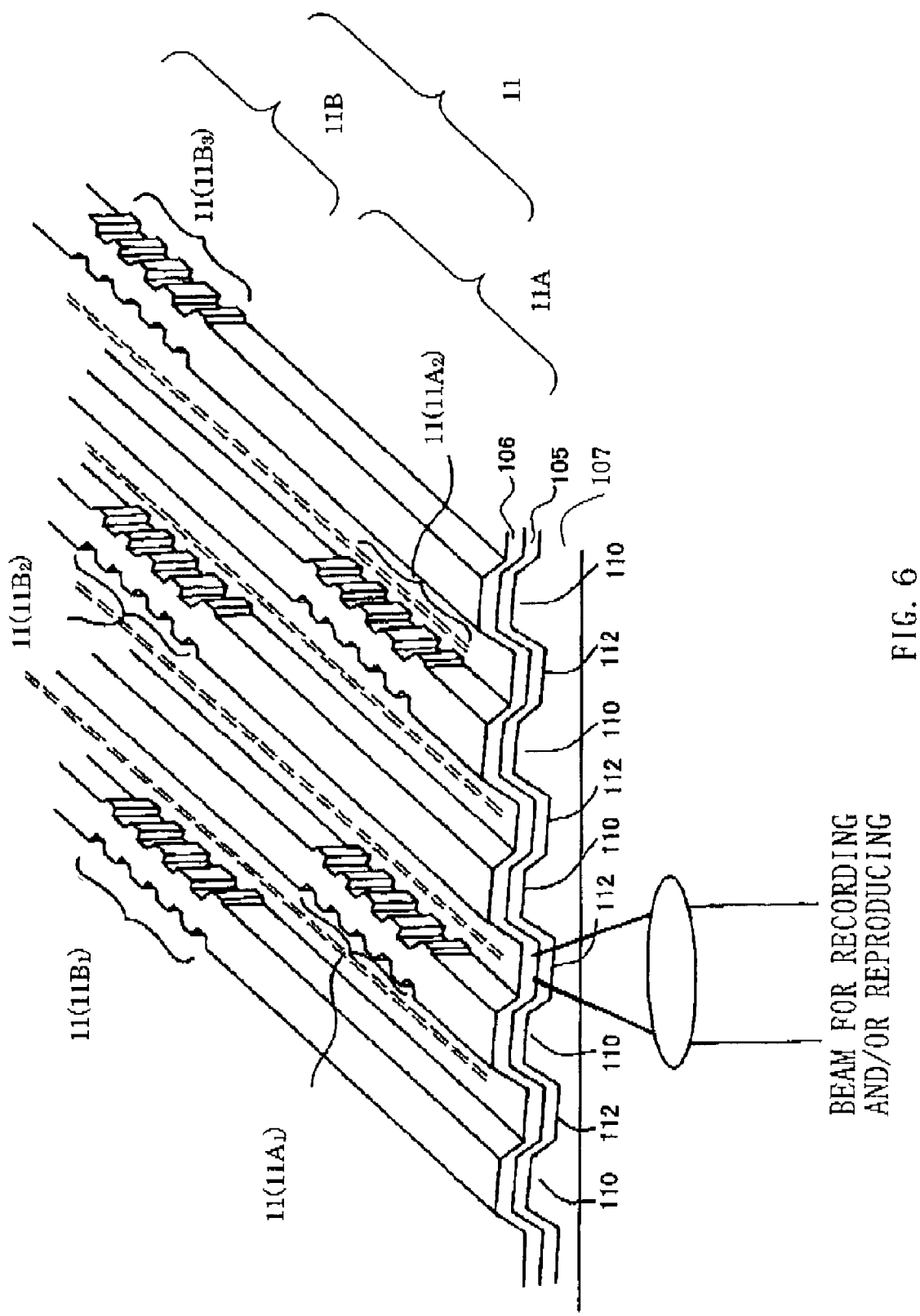
FIG. 6 shows a schematic perspective view of an optical disc as one embodiment according to the present invention, which is manufactured from the stamper shown in FIG. 2.

FIG. 6 is a schematic perspective view corresponding to FIG. 20B, omitting the substrate in FIG. 20B. In other words, FIG. 6 shows an optical disc sequentially including, in this order, the reflection film 106, the recording film 105 and the cover layer 107 with a thickness of 0.1 μm on a pattern forming surface of the optical disc produced by the stamper shown in FIG. 2. In FIG. 6, reference numeral 110 denotes a land (or header recording track) corresponding to the land 10 in FIG. 2, reference numeral 111 is a header recording part corresponding to the header recording part 11 in FIG. 2, and reference numeral 112 denotes a groove (or data recording track) corresponding to the groove 12 in FIG. 2. As shown in FIGS. 6 and 20B, the inventive optical disc arranges the data recording track 112 closer than the header recording track 110 to the incidence surface.

Figure 7:
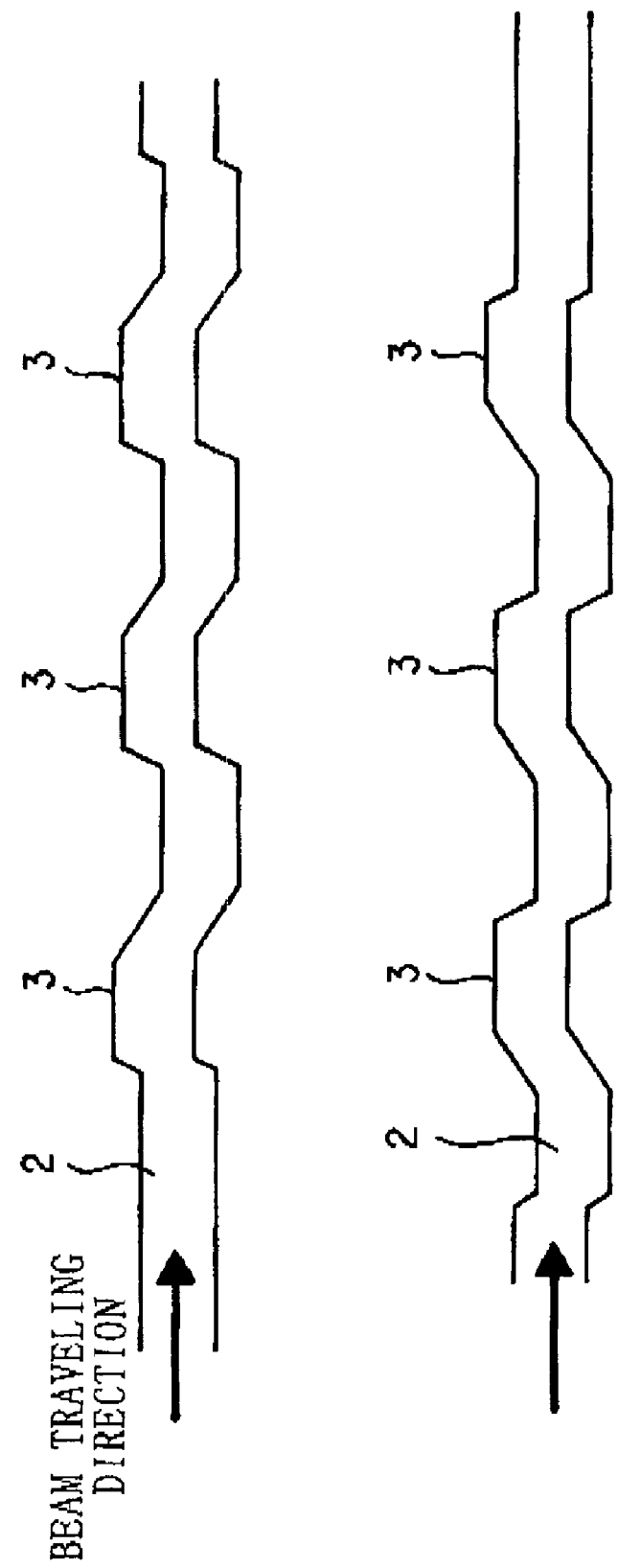
FIG. 7 shows a schematic plane view for explaining a method for recording header information into the header recording part shown in FIG. 2.

Biphase recording or a modulation method using different deflective pattern shapes shown in FIG. 7 may be used to modulate the header information, and a modulation method is not limited. Here, FIG. 7 shows an exemplary modulation pattern as a schematic plane view for explaining a method for recording header information into the header recording part 11. FIG. 7 shows the way of forming a shape of the mark 3 recorded using different deflective speed in the radial direction during deflection. A reproduced signal reflects a difference between transition speeds at the deflection start time and at the deflection end time. For example, after a differentiation process, a large signal may be obtained from a reproduced differential signal of a short transition pattern, and a small signal may be obtained from a reproduced differential signal of a long transition pattern. A difference in detected signal level may be used to record and reproduce information. Alternatively, information may be reproduced using a difference in spectrum distribution and filtering.

A formation of a mark having different transition time is relevant to an information recording speed, and thus the mark should be recorded with means for achieving fast deflection. An electro-optic ("EO") deflector 201 may be used as a fast deflector which does not deteriorate an output of the deflected light. The EO deflector 201 is easily controllable since the deflection speed is controllable as a voltage waveform applied to its electrode, although it requires the relatively high deflection voltage and fast pulse drive operation.

FIG. 8 shows a waveform diagram to be supplied to the stream forming EO deflector 201. The drive voltage is applied to electrodes 202 and 202' separately, and no deflection occurs when no voltage applied to either electrode. FIG. 8 shows a relationship between exposed patterns and signals applied to the electrodes 202 and 202'. In order to obtain exposed pattern shown in FIG. 8A, drive voltages (A) and (B) shown in FIG. 8B are applied to the EO deflector 201 shown in FIG. 8E. On the other hand, in order to obtain exposed pattern shown in FIG. 5C, drive voltages (A)' and (B)' shown in FIG. 8D are applied to the EO deflector 201 shown in FIG. 5E.

A description will now be given of a basic structure and its effects of a pulse drive circuit applied to exposure of the exposed pattern 2, with reference to FIGS. 9 to 11.

Figure 9A:
FIGS. 9A–9C show two waveform diagrams and a circuit diagram of the pulse drive circuit used to form the header recording parts shown in FIG. 2.
Figure 9B:
Figure 9C:
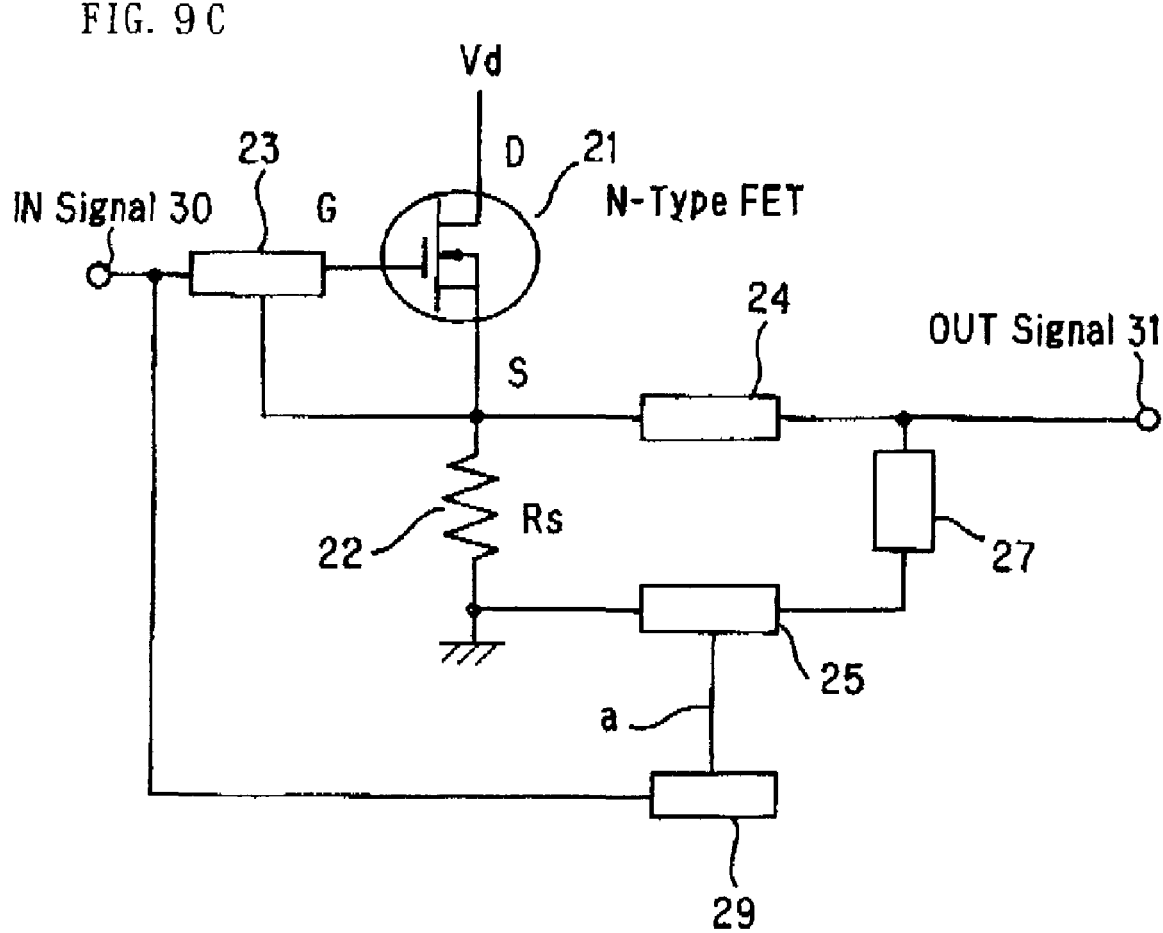

As shown in FIG. 9C, the pulse drive circuit of the instant embodiment includes an N-type FET (field-effect transistor) 21, a source resistor 22, a FET driver 23, two resistors 24 and 27, a switching device 25, and a waveform shaping control circuit 29. The resistors 24 and 27 are each structured as a capacitor, and determine a time constant with the resistor 22 as described later. Although the instant embodiment exemplarily uses an N-type FET, the present invention contemplates a P-type FET.

The FET driver 23 converts a pulse waveform input (IN Signal) 30 shown in FIGS. 9A and 11A into a fast pulse signal of low output impedance, and applies it between a source and a gate in the FET 21. The resistor 24, connected between a pulse waveform output 31 and a node between the source terminal S and the source resistor 22, receives a pulse waveform output (OUT Signal) 31 shown in FIGS. 9B and 11B, and regulates the time constant at the charge time for capacitive load corresponding to the EO deflector 201 (not shown). The resistor 27 regulates the time constant at the discharge time for the capacitive load, and is connected between the pulse waveform output 31 and a node between the source resistor 22 and the ground. Turning on and off of the switching device 25 is controlled by a switch control signal "a" output from the waveform shaping control circuit 29.

The waveform shaping control circuit 29 takes in the pulse waveform input 30 shown in FIG. 10A, and delays the pulse waveform input 30 by preset time period r as shown in FIG. 10B. Then, the waveform shaping control circuit 29 inverts the delayed signal as shown in FIG. 10C, logically sums the delayed signal and the inverted signal, and finally outputs, as shown in FIG. 10D, the switch control signal "a" having a pulse width τ that leads in synchronization with the trailing edge of the pulse waveform input 30.

The pulse drive circuit shown in FIG. 9 converts the pulse waveform input 30 into the fast pulse signal of low output impedance through the FET driver 23, and applies it between the source and gate in the FET 21. The leading edge of the pulse waveform input 30 turns on the gate G of the FET 21, and the pulse waveform output 31 whose leading edge has been regulated in accordance with the resistor 24 is output at both sides of the source resistor 22. In synchronization with the trailing edge of the pulse waveform input 30, the switch control signal "a" shown in FIG. 10D turns on and the switching device 25 turns on at timing that provides remaining voltage. As a results, the pulse waveform output 31 is output at both sides of the source resistor 22, in which trailing edge has been regulated in accordance with the resistor 24. Therefore, a regulation of the resistance of the resistor 27 may properly adjust the leading edge property of the pulse waveform output 31 as shown in FIG. 9B. The trailing edge property of the pulse waveform output 31 varies in accordance with the resistance of the resistor 27. As shown in FIG. 11B, as the resistor 27 has smaller resistance, the pulse waveform output 31 has sharper leading edge property, that is, the waveform closes from "a" to "d" in FIG. 11B. In other words, the resistor has larger resistance values of "a", "b", "c" and "d" in this order.

Figure 12:
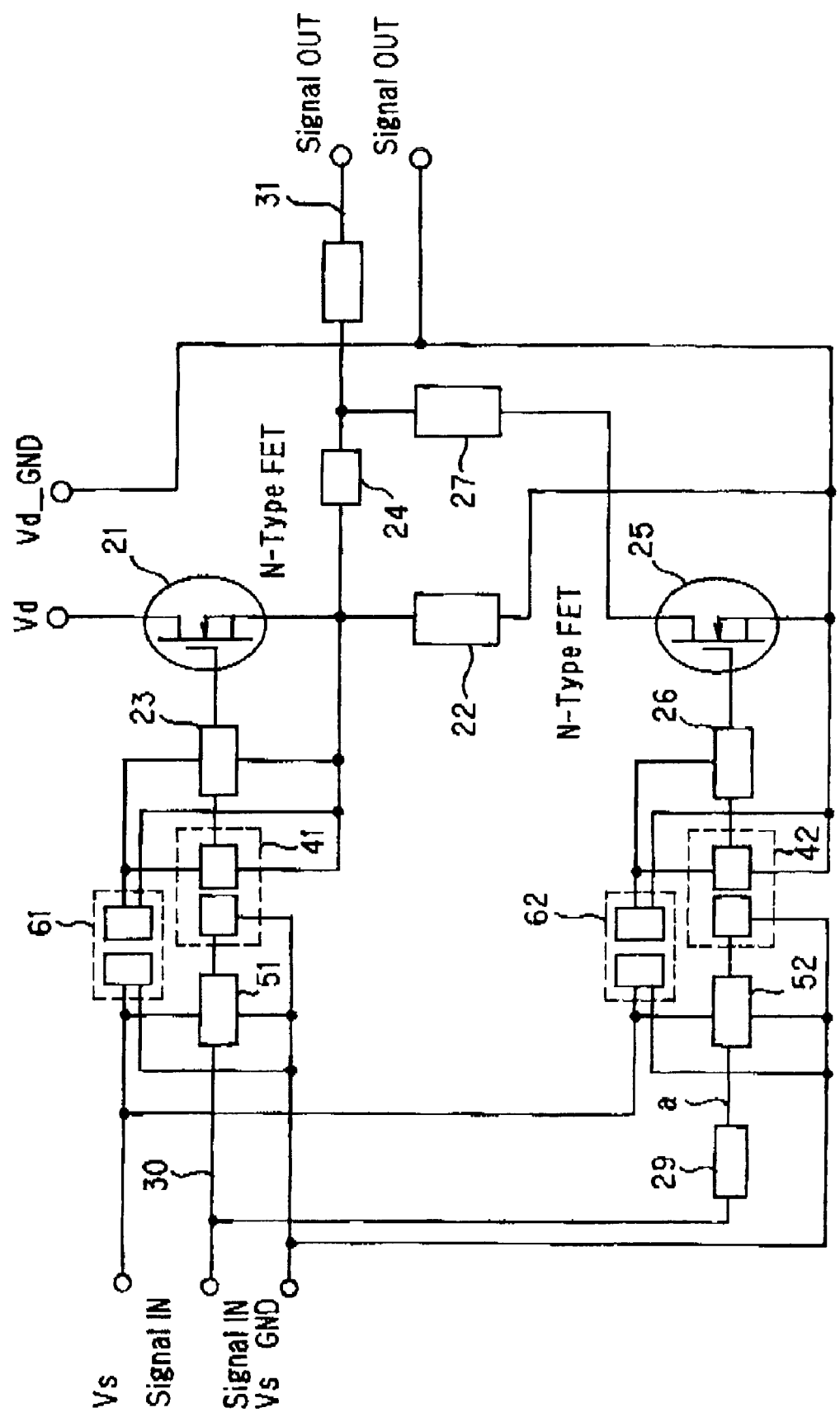
FIG. 12 shows a more concrete circuit diagram of the pulse drive circuit than that of FIG. 9.

The transition time according to a signal to be recorded is controllable through control over the discharge time constant of the circuit. FIG. 9 shows an example to control trailing edge property of a pulse. The FET 21 is a circuit output (or EO input) drive device in FIG. 9. The load of the FET 21 is resistance RS of the resistor 22 for primarily determining the output impedance, which should be sufficiently smaller than the EO deflector as the capacitive load to be connected to the output 31. Control over the impedance viewed from the drive device FET21 for the capacitive load would determine the charge and discharge time constants. This embodiment provides the switching device 25 and device 27 for establishing the discharge time constant so as to set up different charge and discharge time constants. The switching device 25 operates in accordance with a signal linked with an input signal through the driver 29. FIG. 12 shows a circuitry of a more concrete circuit to realize this operational principle. Operations under high voltage would require the input and output circuits to be electrically disconnected. The photocoupler separates both the drive and pulse signals. An actual value required for the device depend upon the required operational speed and the deflection sensitivity of the EO deflector, The drive input impedance for the EO deflector depends upon the property impedance and the length of a cable for connecting the pulse drive circuit and the EO deflector, thus requiring adjustment at the mounting state.

FIG. 12 shows the circuitry of the more practical pulse drive circuit. FIG. 12 is characterized in that the switching device 25 uses an FET similar to the pulse drive device 21, and the same input circuit is provided to each of these FETs 21 and 25 to synchronize these two FETs 21 and 25. In addition, characteristically, the necessary power to drive the FET is maintained by providing photocouplers 41 and 42, pulse processing circuits 51 and 52 including logic devices, and DC—DC converts 61 and 62 for the input circuits of these FETs 21 and 25. Moreover, a matching circuit 32 with the load is provided to an output circuit of the pulse drive device 21 The photocouplers 41 and 42 achieve floating actions associated with the source potentials to drive FETs 21 and 25. The FET drivers 23 and 26 each output a fast pulse signal having low output impedance to drive the FET gate, realizing the fast operation of the FET. The DC—DC converters 61 and 62 are each power supply regulators for obtaining gate voltages necessary to drive the FETs 21 and 25, which serve to supply power supply voltage through the floating action to pulse processing circuits 51 and 52 including logic devices, and the waveform shaping control circuit 29.

Use of the floating DC—DC converts 61 and 62 is required to share power supply with the logic devices, and continue to supply the power supply in cooperation with the source potential. When the FETs 21 and 25 turn on, almost voltage Vd (more precisely, voltage subtracted from a voltage drop portion due to the FETs 21 and 25' on resistance and the source current) is applied to the source resistor 22. In order to add necessary gate voltage to the source voltage, the FET drivers 23 and 26 require power supply higher than the gate voltages to turn on the FETs 21 and 25 in addition to the source voltages. Therefore, it is necessary to separate in potential photocouplers 41 and 42 the DC—DC converts 61 and 62 from the logic devices through the floating action.

When the FETs 21 and 25 turn off, the FET source is connected through Vd_GND through the device 22, and accords with the ground potential of the FET drives 23 and 26. In this way, the ground at the output sides of the photocouplers 41 and 42 and the DC—DC converters 61 and 62, and the ground potential of the FET drives 23 and 26 vary according to actions of the FETs 21 and 25. The pulse processing circuits 51 and 52 including logic devices serve to adjust the pulse length, and regulate the width of the pulse waveform output 31. They may also compensate for fluctuating portions of the pulse width of the FETs 21 and 25 and PET drivers 23 and 26.

The waveform shaping control circuit 29 is one for obtaining a pulse signal for controlling the trailing edge waveform of the pulse waveform output 31, as discussed above, and includes a delay circuit, an inverter, and a gate circuit. Similar to the pulse drive circuit of this embodiment, even in outputting the pulse waveform output 31 whose phase has been inversed by the FET 21, the leading edge of the pulse waveform output 31 may be controlled.

The matching circuit 32 with the load is provided so as to reduce the waveform distortion in the pulse waveform output 31 as a result of connection to the load, and to enhance the effects of the present invention. For example, for the load as static capacitance, the matching circuit 32 having a damping resistor would reduce the negative influence of the reflection by the load, and thus the waveform distortion. Also, in this case, the waveform of the pulse waveform output 31 to be:supplied to the load device is controllable by dividing the damping resistor and controlling impedance at the divided point.

Figure 13:
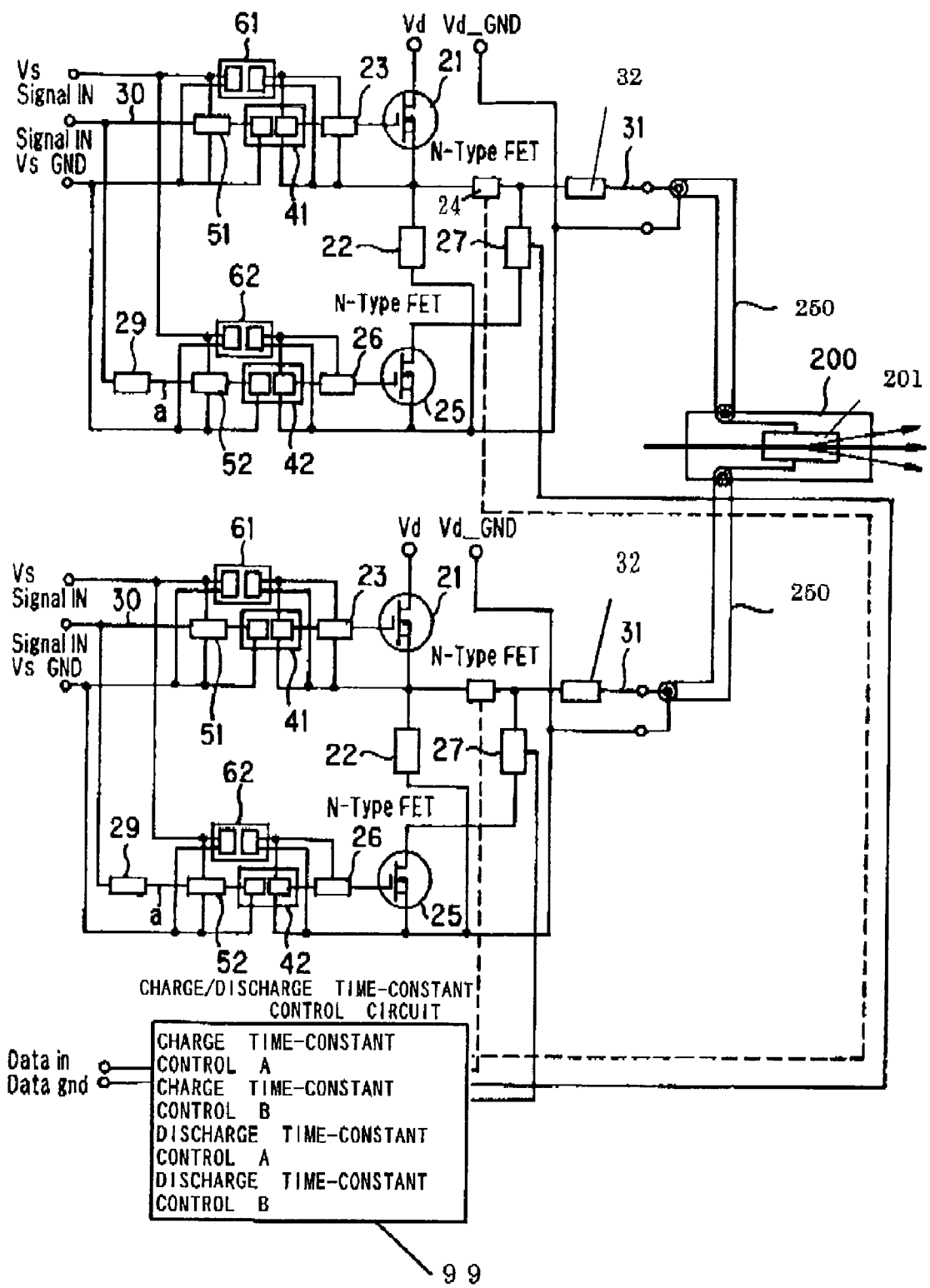
FIG. 13 shows a circuit diagram of an EO drive circuit applicable to the manufacture of the stamper shown in FIG. 2, etc.

FIG. 13 shows an EO drive circuit using the pulse drive circuit shown in FIG. 12. As understood from FIG. 13, the EO drive circuit of this embodiment is a circuit for generating a signal (A), (A)', (B) or (B)' in FIG. 8C. The EO drive circuit shown in FIG. 13 uses two systems of pulse drive circuit shown in FIG. 12, and connects these circuits to electrodes of the EO deflector 200 through coaxial cables 250. Moreover, control over the impedance of the circuit element 24 connected in series to the load circuit would control the charge time constant for the output circuit including the EO deflector 200. Similarly, control over the impedance of the circuit element 27 connected in parallel to the load circuit would control the discharge time constant for the output circuit including the EO deflector 200. The charge/discharge, time-constant control circuit 99 generates control signals in accordance with recorded data, which generate signals (A), (A)', (B) and (B)' shown in FIG. 8C.

Figure 14:
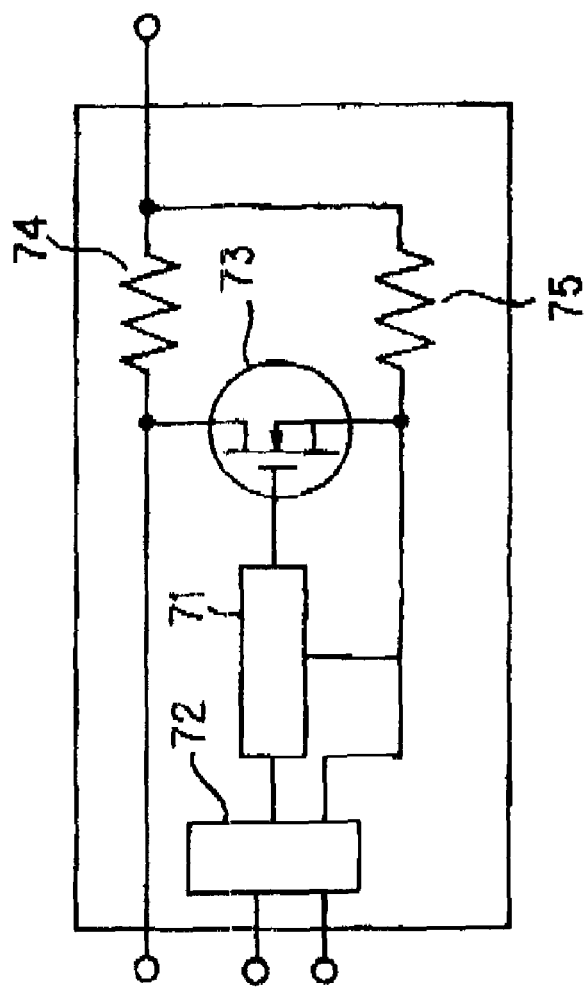
FIG. 14 shows an exemplary diagram of an adjustable impedance circuit.

FIG. 14 shows a structure of an adjustable impedance circuit. This circuit is one for controlling the impedance using a charge/discharge time-constant control signal, and employs an FET 73 as a switching device. When the FET 73 turns on, that is, when the impedance of the FET 73 lowers, the resistors 74 and 75 are connected in parallel. More accurately, the on resistance of the FET 73 and the direct impedance of the resistor 75 are connected to the resistor 74 in parallel, reducing the entire impedance and controlling the time constant of the load circuit connected to this. The circuit relates to the charge time constant device when serving as the circuit device 24 connected in series to the load circuit, while the circuit relates to the discharge time constant device when serving as the circuit device 27 connected in parallel to the load circuit. When the FET 73 turns off, the resistor 75 is disconnected from the resistor 74, and the circuit serves as an impedance device defined only by the resistor 74. The circuit element 71 is a FET driver for driving the FET 73, and electrically isolated from the charge/discharge time-constant control signal through the coupler 72, so as to maintain the isolation state of the adjustable impedance circuit including ground potential so that a device may be inserted at an arbitrary circuit location.

The charge/discharge time-constant control circuit 99 is a matrix circuit, and generates control signals for controlling four impedance functional devices shown in FIG. 13. For example, FIG. 5C needs the EO drive signal having leading or trailing edge property of one of signals (A), (A)', (B), and (B)' so as to control optical deflection. For example, the upper circuit in FIG. 13 obtains the drive signal (A), while the lower circuit in FIG. 13 obtains the drive signal (B). The shorter charge time constant would provide sharper leading edge property in the signal (A), and thus reduces the impedance of the circuit device 24 connected in series to the load. In other words, the charge/discharge time-constant control signal is set so that the FET 73 shown in FIG. 14 turns on. When the FET 73 turns off, the charge time constant becomes large, and thus the resistor 74 is set up so as to obtain the necessary time constant. Setup of the resistors 74 and 75 would set up the sharpness in the leading edge property. The setup of the discharge time constant in the trailing edge is similar, and the impedance change of the circuit device 27 connected in parallel to the load varies the discharge time constant, thereby controlling the sharpness in the trailing edge property. Obviously, the drive signal (B) is obtained similar to the signal (A). Here, signals (A)' and (B)' represent inversion states of the data inputs (A) and (B).

Figure 15:
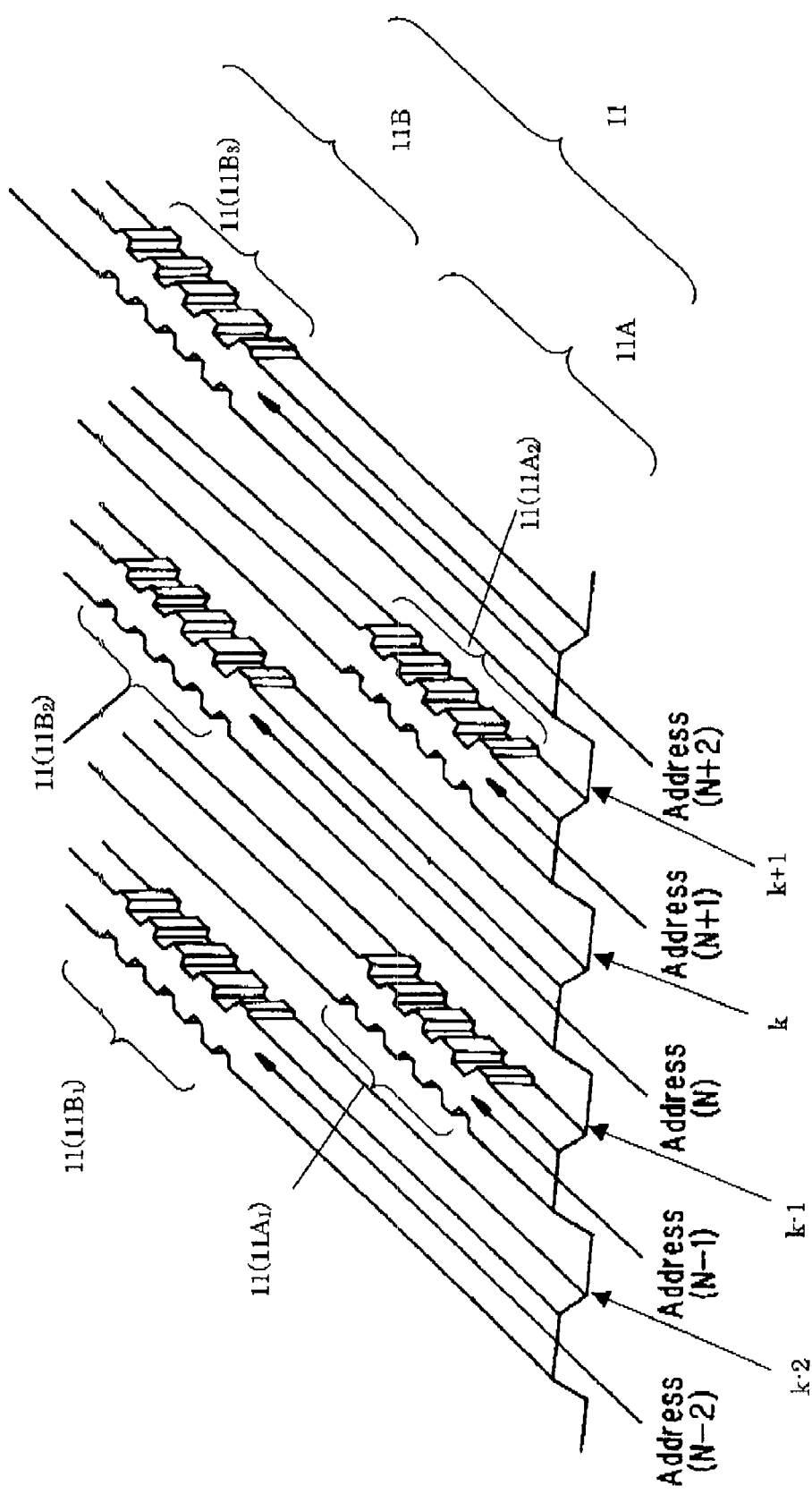
FIG. 15 shows a schematic perspective view of an address format of the optical disc according to the present invention.

FIG. 15 shows the way of recording header information using deflection. The header address information has been added so that each track may be identified. As addresses are arranged so that they offset or zigzag between adjacent tracks, the data recording track between two header recording tracks reproduces left (or right) header information first, and then right (or left) header information. For example, the data recording track (k−2) with reference number 12 in FIG. 2, may obtain address information (N−1) corresponding to data recording part $11A_1$ at the right side in the traveling direction) and address information (N−2) corresponding to data recording part $11B_1$ at the left side in the traveling direction. In FIG. 16, ID1 corresponds to 11A and ID2 corresponds to 11B. Similarly, the data recording track (k−1) may obtain address information (N) corresponding to data recording part $11B_2$ at the right side in the traveling direction, and address information (N−1) corresponding to data recording part $11A_1$ at the left side in the traveling direction. This corresponds to data track number (k−1) in FIG. 16. The data recording track (k) may obtain address information (N+1) corresponding to data recording part $11A_2$ at the right side in the traveling direction, and address information (N) corresponding to data recording part $11B_2$ at the left side in the traveling direction. This corresponds to data track number (k) in FIG. 16. The data recording track (k+1) may obtain address information (N+2) corresponding to data recording part $11B_3$ at the right side in the traveling direction, and address information (N+1) corresponding to data recording part $11A_2$ at the left side in the traveling direction. This corresponds to data track number (k+1) in FIG. 16. In this way, each data recording track may obtain two different pieces of address information.

FIG. 16 summarizes the address information stored in the header recording part 11 and the right/left information, and groove's address in a table. Here, "Data Track No." denotes the correct address information or groove's track address information. The address information is derived from a reproduced mark that has been recorded at outer and inner sides with respect to the exposure groove, and serves as a solution for a mechanical warp of an optical disc. The header information track that has been set to be sufficiently smaller than the data recording track would provide a high density and a tracking servo signal. This structure is used as a so-called groove recording format.

Information indicative of an address is used to identify a position at which information is recorded, in recording data on the optical disc. However, as shown in FIG. 16, the data track number and the address information, such as information of ID1 and ID2, are not readily apparent. For example, the reproduced address information for the data track number (k) is (N+1) and (N). Reproducible different plural pieces of ID information advantageously provide redundancy. However, the data track number or the correct address information cannot be detected directly, and thus a determination is required in accordance with a logic shown in FIG. 16. For example, when one side of ID information is not obtainable due to a defect, etc., the side information indicative of which side the readable ID information is: readable from is needed because the ID information is different between the right side (or "R" in FIG. 16) and the left side (or "L" in FIG. 16).

For example, suppose that the ID2 is not readable. The data tracks (k) and (k+1) have the same (N+1) as ID1. However, the data track (k) obtains (N+1) at the right side (i.e., "R") and the data track (k+1) obtains (N+1) at the left side (i.e., "L"). The same applies to the ID2. The current address is accurately discoverable using such side information, and the optical drive may be incorporated with this process.

In this way, the inventive format method includes the steps of writing different address information for each land 110, and addressing (i.e., providing a data track number to) the grooves 112 by using the address information in combination with side information indicative of which side of the land 110 has the address information for the groove 112.

One embodiment stores the table shown in FIG. 16 in the management area (not shown) in the optical disc and downloads it into a memory 380 in the drive 300, as will be described later.

Figure 17:
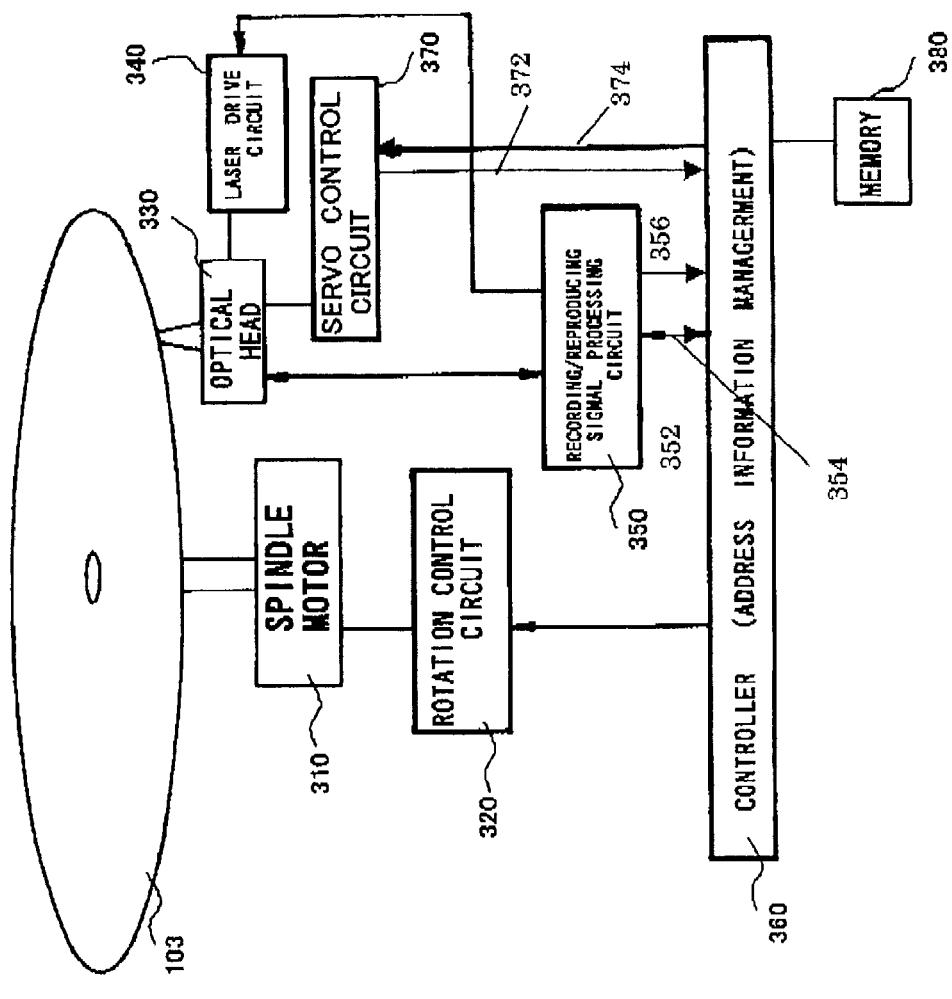
FIG. 17 shows a block diagram of an optical disc drive according to the present invention.

FIG. 17 shows an exemplary drive 300 for the optical disc 103. The drive 300 of this embodiment may obtain correct address information from a matrix shown in FIG. 16 using ID information obtained from a reproduced signal through the recording/reproducing signal processing circuit 350 and address information management function in the controller 360.

More specifically, the drive 300 includes a spindle motor 310, a rotation control part 320, an optical head 330, a laser drive circuit 340, a recording/reproducing signal processing circuit 350, a controller 370, a servo control circuit 370, and a memory 380. The spindle motor 310 rotates the optical disc 103, and the rotation control part 320 controls rotations of the spindle motor 310. The optical head 330 irradiates an optical beam along the data recording track 112 or groove. As shown in FIG. 20B, the instant embodiment irradiates an optical beam through an incidence surface upon the film layer, not through the substrate. The laser drive circuit 340 controls the optical beam by the optical head 330. The recording/reproducing signal processing circuit 350 obtains a reproduced signal based on a waveform of a readout signal detected by the optical head 330, and supplies information to be recorded by the optical head 330 to the optical head 330. The controller 360 controls each section, and serves to manage address information so that it may obtain correct address information based on address information reproduced by the recording/reproducing signal processing circuit 350.

The controller 360 determines correct address information based on the address information reproduced from the headed recording part 111 of the optical disc 103 and a position at which the address information is recorded (i.e., information on right or left). The controller 360 is connected to the memory 380 including a ROM, a RAM, and other storage part for storing the table shown in FIG. 16. The structure shown in FIG. 16 may be stored in a ROM and a storage part instead of the memory 380 if it is common to all the optical discs 103 compatible with the drive 300. If the structure shown in FIG. 16 differs according to optical discs 103, the management area in the optical disc 103 may store the table shown in FIG. 16 and the optical head 330 may read it out and download it into the memory 380, such as a RAM and a storage part, whenever the optical disc 103 is loaded.

The controller 360 detects address information that is different according to lands 110, determines from which side among the right and left lands 110 of the groove 112 the optical head 330 for recording data into and reproducing data from the groove 112 has read out the address information, and identifies the address (or data track number) of the groove 112 from the table in FIG. 16 stored in the memory 380 using detection results of the address information and the right/left information. More specifically, the signal lines 352, 354 and 356 are provided between the recording and reproducing signal processing circuit 350 and the controller 360. The signal lines 352 and 354 are used to transmit and receive signals to be recorded and reproduced signals. The signal line 356 is used to transmit address information (i.e., N−1, N, N+1 in FIG. 16). In addition, there are signal lines 372 and 374 between the servo control circuit 370 and the controller 360. The signal line 372 is used to transmit a polarity determination signal, while the signal line 374 is used to transmit a servo signal. The polarity determination signal read by the optical head 330 is sent to the controller 360 through the signal line 372 from the servo control circuit 370. The polarity determination signal indicates R and L in FIG. 16. As a result, the controller 360 obtains both address information and polarity determination signal, and then acquires the data track number referring to a relationship in FIG. 16 stored in the memory 380.

Although the aforementioned address information management uses the controller 360, it may use logic means and circuit means other than the controller 360 as a drive circuit to obtain the correct address information. It is an essential function of the drive to process the reproduced information for information necessary for recording and reproducing, and FIG. 17 merely depicts one embodiment thereof.

Further, the present invention is not limited to these preferred embodiments, and various variations and modifications may be made without departing from the scope of the present invention. For example, the instant embodiments describe the groove recording, but the present invention does not eliminate the land/groove recording which records data onto both the land and the groove. In recording data into the land, two header recording parts are preferably provided in each land for redundancy purposes. As a result, while the instant embodiment provides double header recording parts, such an embodiment provides a structure of triple header recording parts. Either case may detect plural addresses. The address information may be broken down into several pieces and dispersed. Alternatively, only one address information may be provided at one location.

The optical disc of the embodiment according to the present invention may record address information at both sides of the land redundantly, thereby increasing the reading reliability while providing the higher recording density.

The optical disc manufacturing method of the embodiment uses a single optical beam to form a wobbling header of a stagger structure which has a narrower width than that formed by two beams for exposing the header information in the deflective manner, thereby providing the optical disc with higher recording density, in particular, the track density in the radial direction.

As the optical disc drive has the address information management part for determining the correct address based on the address information reproduced from the circumferentially alternately offset header recording parts, and a side at which the address information is recorded, even when the address information is unavailable from one side of the circumferentially alternately offset header recording part, the address information reproduced from the other side and the recorded side information of the address information would provide the correct address information, recording and reproducing the above optical disc having the inventive format.

Thus, the present invention may provide a more reliable optical disc with higher density, which redundantly records address information, a method for manufacturing the same, a drive for the same, and a stamper used to manufacture the same.

What is claimed is:

1. An optical disc comprising a plurality of lands and grooves alternately arranged in a radial direction of said optical disc, each land wobbling in the radial direction and recording a header recording part for holding address information, there being a difference in elevation between each land and each groove, each groove having a data recording part for storing data, wherein the header recording parts offset alternately for respective lands in the radial direction, the data recording part in said groove and the header recording part in said land are arranged offset in a circumferential direction of said optical disc, and the header recording part in each land enables the same address information to be reproduced for two grooves at both sides of said each land.

2. An optical disc according to claim 1, wherein the header recording part records a mark that has a front edge and a back edge differently inclined from the front edge so that a difference between inclinations of the front and back edges may express present information.

3. An optical disc according to claim 1, wherein said groove is arranged closer than said land to an incidence surface of an optical beam for recording and/or reproducing the data.

4. An optical disc according to claim 1, wherein the wobbling of each land include a plurality of radially offset areas extending radially in both directions.

5. An optical disc comprising a plurality of lands and grooves alternately arranged in a radial direction of said optical disc, each land wobbling in the radial direction and recording a header recording part for holding address information, there being a difference in elevation between each land and each groove, each groove having a data recording part for storing data,
wherein the header recording parts offset alternately for respective lands in the radial direction, the data recording part in said groove and the header recording part in said land are arranged offset in a circumferential direction of said optical disc, and the header recording part in each land enables the same address information to be reproduced for two grooves at both sides of said each land, and
wherein said optical disc further includes an area between the header recording parts offset in the circumferential direction so that the header recording parts do not overlap in the radial direction in the area.

6. An optical disc according to claim 5, wherein the area includes a mark for reading out a synchronization signal.

7. An optical disc according to claim 5, wherein the land has a width in the radial direction of 0.30 µm or below.

8. An optical disc according to claim 5, wherein the wobbling of each land include a plurality of radially offset areas extending radially in both directions.

9. An optical disc according to claim 5, wherein said groove is arranged closer than said land to an incidence surface of an optical beam for recording and/or reproducing the data.

10. A method for formatting grooves in an optical disc comprising a plurality of lands and grooves alternately arranged in a radial direction of said optical disc, each land wobbling in the radial direction and recording a header recording part for holding address information, there being a difference in elevation between each land and each groove, each groove having a data recording part for storing data, wherein the header recording parts offset alternately for respective lands in the radial direction, the data recording part in said groove and the header recording part in said land are arranged offset in a circumferential direction of said optical disc, and the header recording part in each land enables the same address information to be reproduced for two grooves at both sides of said each land, said method comprising the steps of:
writing different address information for each land; and
addressing the grooves using a combination of the address information and side information indicative of which side of the land has the address information for the groove.

11. A method for identifying an address of an optical disc comprising a plurality of lands and grooves alternately arranged in a radial direction of said optical disc, each land wobbling in the radial direction and recording a header recording part for holding address information, there being a difference in elevation between each land and each groove, each groove having a data recording part for storing data, wherein the header recording parts offset alternately for respective lands in the radial direction, the data recording part in said groove and the header recording part in said land are arranged offset in a circumferential direction of said optical disc, and the header recording part in each land enables the same address information to be reproduced for two grooves at both sides of said each land, said method comprising the steps of:
detecting the address information different for each land;
determining which side of the land has the address information for the groove, which address information is readable by an optical beam for recording and/or reproducing the data; and
identifying an address of the groove using the address information and side information indicative of which side of the land has the address information for the groove.

12. A stamper comprising a plurality of lands and grooves alternately arranged in a radial direction of said optical disc, each land wobbling in the radial direction and recording a header recording part for holding address information, there being a difference in elevation between each land and each groove, wherein the header recording parts offset alternately for respective lands in the radial direction, and the header recording part in each land enables the same address information to be reproduced for two groove at both sides of said each land.

13. A method for manufacturing an optical disc comprising a step of transferring a signal surface onto a disc substrate using a stamper, wherein the stamper is a master produced in a master production process that exposes header information in a deflection manner using a single optical beam that may deflect in a radial direction while offset recording the header information in a circumferential direction for adjacent parts each of which holds the header information.

14. A method according to claim 13, wherein an electro-optic deflector is used to deflect the optical beam, and has an electrode supplied with such a voltage that leading and trailing edges inclining over time in a pulse waveform may change in accordance with preset information.

15. A method according to claim 14, wherein a time-dependent inclination in the pulse signal for driving the electro-optic deflector is controlled by a time constant of a circuit including the electro-optic deflector.

16. A drive for an optical disc comprising a plurality of lands and grooves alternately arranged in a radial direction of said optical disc, each land wobbling in the radial direction and recording a header recording part for holding address information, there being a difference in elevation between each land and each groove, each groove having a data recording part for storing data, wherein the header recording parts offset alternately for respective lands in the radial direction, the data recording part in said groove and the header recording part in said land are arranged offset in a circumferential direction of said optical disc, and the header recording part in each land enables the same address information to be reproduced for two grooves at both sides of said each land, said drive comprising:
- a rotation control part for controlling rotations of the optical disc;
- an optical head for irradiating an optical beam along the groove;
- a recording/reproducing signal processing circuit for obtaining a reproduction signal from a readout signal waveform detected by said optical head; and
- an address information management part for obtaining correct address information from the address information reproduced by said recording/reproducing signal processing circuit, said address information management part determining the correct address based on the address information reproduced from the header recording parts alternately offset in the circumferential direction, and a side at which the address information is recorded.

17. A drive according to claim 16, wherein the optical disc has a sectional structure that includes a substrate, a reflection film and a recording film in this order,
   wherein the optical head irradiates the optical beam onto the recording film in the optical disc from a side opposite to the substrate with respect to the reflection film.

* * * * *